US012715173B2

(12) United States Patent
Czasny et al.

(10) Patent No.: US 12,715,173 B2
(45) Date of Patent: Aug. 25, 2026

(54) PRINT HEAD FOR ADDITIVE MANUFACTURING USING CONTINUOUS FIBERS AND THERMOPLASTIC MATRIX MATERIALS FOR CUTTING IN A HOT ZONE OF THE PRINT HEAD BY RADIAL OR ROTATIONAL MOVEMENT OF A CUTTING DEVICE

(71) Applicant: TECHNISCHE UNIVERSITÄT BERLIN, Berlin (DE)

(72) Inventors: Mathias Czasny, Berlin (DE); Aleksander Gurlo, Berlin (DE); Stephan Körber, Berlin (DE); Onur Kaba, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 151 days.

(21) Appl. No.: 18/575,196

(22) PCT Filed: Jun. 30, 2022

(86) PCT No.: PCT/EP2022/068082
§ 371 (c)(1),
(2) Date: Dec. 28, 2023

(87) PCT Pub. No.: WO2023/275262
PCT Pub. Date: Jan. 5, 2023

(65) Prior Publication Data

US 2024/0351279 A1 Oct. 24, 2024

(30) Foreign Application Priority Data

Jul. 1, 2021 (EP) .................................... 21183040

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/295* (2017.08);
(Continued)

(58) Field of Classification Search
CPC ... B29C 64/209; B29C 64/118; B29C 64/295; B29C 64/314; B29C 64/214; B29C 70/382; B33Y 10/00; B33Y 30/00; B33Y 40/10
See application file for complete search history.

(56) References Cited

U.S. PATENT DOCUMENTS

| | | | |
|---|---|---|---|
| 9,370,896 | B2 | 6/2016 | Mark |
| 2015/0016591 | A1 | 1/2015 | Duhamel |

(Continued)

FOREIGN PATENT DOCUMENTS

| | | | |
|---|---|---|---|
| DE | 102018002545 A1 | 10/2019 | |
| EP | 3613581 A1 | 2/2020 | |

(Continued)

OTHER PUBLICATIONS

Rietema et al., Design of a Prototype Machine for 3D Printing with Continuous Fibre Reinforcement, Master Thesis, Jun. 15, 2015, 108 pages.

(Continued)

*Primary Examiner* — Michael M. Robinson
(74) *Attorney, Agent, or Firm* — FisherBroyles, LLP; Robert Kinberg

(57) ABSTRACT

A print head for additively manufacturing fiber-reinforced composite materials includes a feed channel, a heating block, a nozzle and a cutting unit. A filament of the fiber-reinforced material enters an inlet of the nozzle through the feed channel, leaves the nozzle via an outlet of the nozzle, and is deposited on a print bed. The cutting unit is located inside the heating block which has a beneficial effect on the
(Continued)

cut and/or the shearing of the material to be printed. The invention also relates to a method in which the filament is cut and/or sheared, wherein the cutting unit performs a linear movement or rotation, or the print head per se performs a linear movement or rotation, as a result of which the filament is cut and/or sheared off.

15 Claims, 9 Drawing Sheets

(51) Int. Cl.
*B29C 64/295* (2017.01)
*B29C 64/314* (2017.01)
*B33Y 10/00* (2015.01)
*B33Y 30/00* (2015.01)
*B33Y 40/10* (2020.01)

(52) U.S. Cl.
CPC ............ *B29C 64/314* (2017.08); *B33Y 10/00* (2014.12); *B33Y 30/00* (2014.12); *B33Y 40/10* (2020.01)

(56) References Cited

U.S. PATENT DOCUMENTS

2016/0144565 A1* 5/2016 Mark .................... B29C 64/106 425/166
2019/0168451 A1* 6/2019 Mark .................... B29C 64/321
2020/0114578 A1 4/2020 Azarov
2022/0274337 A1* 9/2022 Okamoto .............. B29C 64/321
2023/0339182 A1* 10/2023 Burchard ................ B22F 12/13

FOREIGN PATENT DOCUMENTS

WO 2014153535 A2 9/2014
WO 2020087048 A1 4/2020
WO 2020094829 A1 5/2020

OTHER PUBLICATIONS

International Search Report in corresponding International Patent Application No. PCT/EP2022/068082, mailed Oct. 6, 2022, 7 pages with English Translation.

* cited by examiner

PRINT HEAD FOR ADDITIVE MANUFACTURING USING CONTINUOUS FIBERS AND THERMOPLASTIC MATRIX MATERIALS FOR CUTTING IN A HOT ZONE OF THE PRINT HEAD BY RADIAL OR ROTATIONAL MOVEMENT OF A CUTTING DEVICE

BRIEF SUMMARY OF THE INVENTION

In a first aspect, the invention relates to a print head for the additive manufacturing of reinforced fiber composite materials, comprising a feed channel, a filament, a heating block, a nozzle, and a cutting unit. The nozzle has an inlet and an outlet and the filament enters the inlet of the nozzle through the feed channel, leaves the nozzle via the outlet and is deposited on a print bed. For this, the cutting unit is located within the heating block. This has a beneficial effect on the cutting and/or shearing of the material to be printed.

In a further aspect, the invention relates to a method for cutting and/or shearing the filament, wherein the cutting unit performs a linear or rotational movement, or the print head itself performs a linear or rotational movement, so that the filament is cut and/or sheared.

In an additional aspect, the invention relates to a system comprising several print heads according to the invention.

BACKGROUND AND PRIOR ART

During the course of the 21$^{st}$ century, additive manufacturing methods, also known as 3D print or rapid prototyping, have become more favored and known. In some areas, these technologies have already entered into series production and are not only used for prototypes. According to current Norms and Standards DIN EN ISO/ASTM 52900:2018, a distinction is made between seven different categories of the additive manufacturing. A known example is the material extrusion where the material is applied directly to a base plate in the form of melted granulate or wire (filament). Another option is the powder-based melting where the component is produced from a powder bed. Other methods utilize UV-hardenable resins (photo polymerization in a bath and material jetting). Furthermore known are technologies based on wire, powder, liquid materials and/or layers of complete plates/foils.

The proposed invention in particular must be assigned to the material extrusion technology (English: fused deposition modeling (FDM) and/or fused filament fabrication (FFF)). With this method, material paths are deposited continuously in that the material is pressed through a mostly heated nozzle. These paths are deposited in layers, depending on the specified outer contour and inner design, thus constructing the three-dimensional object.

One critical component of a 3D printer—the device for realizing the additive manufacturing—is its print head. The material for the printing process is extruded (pressed out) through its print head. The material frequently comprises a thermoplastic polymer, which is heated to a processing temperature, preferably via the melting and/or softening temperature to the thermoplastic material state and is then pressed through the nozzle, an important component of the print head. Through the subsequent cooling, the printed geometry is frozen and maintains its shape. The materials can be divided into reinforced and unreinforced thermoplastics, meaning whether it relates to a pure thermoplastic (not filled, phase 1) or a filled thermoplastic (phase 1 reinforcing and phase 2 matrix). Reinforced thermoplastics are called compound materials. If the fiber length is endless, continuous or long, the expression fiber-reinforced compound material is frequently also used. With reinforced thermoplastics, the dimensions of the reinforcement must be considered. Short fibers (fiber length approx. 50 μm-approx. 500 μm) can be processed in the same way as unreinforced thermoplastics. At the end of the path, a retract is carried out (pulling back of the filaments and associated reduction in pressure) and the melted strand is cut when the nozzle moves at high speed to the next position. With longer fiber lengths (fiber length approx. 10 mm-approx. 100 mm), especially with continuous fiber reinforcement (fiber length>100 mm), the strand must be cut before, inside or after the nozzle since a cutting via retract is no longer possible with a high number of fibers. The tensile strength of the material is high enough that it would tear the printed component off the platform. In addition to the nozzle, the print head comprises other components which will be addressed further below.

The prior art discloses diverse configurations for 3D printers and print heads, in particular:

Published US Patent Application 2015/016591 A1 discloses a 3D printer with a print head that comprises a cutting device, which is controlled by a control and cuts the continuous fiber-reinforced filament during the depositing process, thereby allowing the forming of structures or specific patterns on top or in the component to be printed. The fiber can be oriented through the unidirectional deposition of the continuous, fiber-reinforced filament. The orienting of the fiber leads to a strong anisotropy which develops into high tensile strengths in fiber direction (fiber-dominant) and low strengths perpendicular to the fiber (matrix-dominant). The cutting takes place before the melting of the filament. A software called a slicer is furthermore run in the computing unit, which determines the movements of the print head and the cutting movement in cutting direction.

Published PCT Application WO 2014/153535 A2 also discloses a print head comprising a cutting unit. The cutting unit cuts a cutting mechanism through the fiber-reinforced continuous filament, wherein this cutting unit is attached to a support plate. The cutting unit can cut and/or shear off the filament before it reaches the print head or after it leaves the print head to arrive on the print bed.

In U.S. Pat. No. 9,370,896 B2, the same positions are disclosed for the cutting unit as in the previously mentioned patent documents.

Published US Patent Application 2020/0114578 A1 discloses a print head for the additive manufacturing where the cutting unit is located between a feed channel and the heating block. A servo drive is used to operate the cutting unit. The cutting unit itself can be a movable or stationary knife.

German patent document DE 102018002545 A1 discloses a method for producing an extrudate. A cutting unit is described therein which can cut off, if necessary, the extrudate pressed out of an extrusion unit. The cutting unit comprises a movable cutting element, positioned with the aid of a carriage on a base body, thereby allowing a translational movement for the cut.

EP patent document 3613581 A1 discloses a 3D printer for printing a fiber-reinforced composite filament. The print head of the 3D printer has a composite filament ironing tip heated by a heater. A control unit implements instructions for the heater to heat up the composite filament ironing tip, which optimizes the flow of the composite filament. In particular, the matrix material flows between the axial fiber strands within the composite filament. A cutting tool is also disclosed, which is arranged at a position between the filament drive and the composite filament ironing tip. The cutting tool in this case is arranged either before or after the hot area. The formulation "hot area" refers to a zone having a noticeably higher temperature as compared to other areas. The average person skilled in the art knows the meaning of the formulation "hot area."

Published PCT Application WO 2020/087048 A2 discloses a method for an additive manufacturing method. For this, two ¿ types, a first material and a second material, are conveyed, wherein these comprise a thermoplastic matrix and reinforced fibers. The first material has a first cross-sectional profile. Following the processing steps such as depositing, heating and solidifying of a first region of the first material, it is transferred to a second state with a second cross-sectional profile. Through repeating these steps, a uniform composite object is formed with M segments of the first material. Applicators are furthermore disclosed which can comprise a subtractive manufacturing element for trimming or milling parts of the deposited composite material. An applicator can furthermore also be an ultrasonic cutter.

Published PCT Application WO 2020/094829 A1 discloses a print head for the additive manufacturing of a fiber-reinforced composite material, comprising a fiber reinforcement in a polymer matrix. The print head comprises an infiltration unit for the mixing and/or infiltration of a fiber roving with melted polymer. In addition, the print head has a feed line for a polymer and/or a fiber roving to the infiltration unit, as well as a heating element for the partial melting of the polymer within the infiltration unit. The print head furthermore comprises a deflection element within the infiltration unit and a discharge on the infiltration for the generated reinforced fiber composite material from the infiltration unit. For this, the melted polymer and the fiber roving can be conducted within the infiltration unit along a channel between intake and discharge. The fiber roving furthermore can sectionally be deflected by the deflection element within the feed channel, either crosswise and/or at an angle to a straight line guide between feed-in and discharge. A tool for cutting of the reinforced fiber composite material is also disclosed, which can be installed in front of a nozzle or between the nozzle and the infiltration unit.

A 3D printer is disclosed in Rietema, Menno-Jan, *Design of a prototype machine for 3D printing with continuous fiber reinforcement*, MS thesis, University of Twente (2015), which functions on an FDM basis. A composite material is used for the filament which comprises polypropylene for the matrix and glass fibers for the fibers. A cutting mechanism is also disclosed, which is positioned following the heated nozzle. An ultrasonic cutter as well as a wire cutter—for cost reasons—are disclosed as preferred options used for a cutting operation. It must be emphasized in particular that the cutting unit realizes the filament cut only after the nozzle and is not connected to the nozzle.

All of these devices and methods for the additive manufacturing, known from the prior art, have in common that the material to be cut or sheared is more likely broken, rather than actually cut. In particular, this is due to the fact that the material, which in most cases is fiber-reinforced, is highly brittle, thus making the cutting of the material more difficult.

For the prior art, it must furthermore be taken into account for the slicer that the cut occurs prior to the end of the path. The remaining filament is conveyed by the heating block via the nozzle to the print bed. With a new path, the filament must be moved up to the nozzle, so as to actually begin at the starting point for the material deposit. Additional computing operations in the slicer are thus required, which make the complete printing process slower and more complex.

The prior art does not disclose any additive manufacturing methods that allow an especially simple and efficient cut of the material to be printed, especially not for fiber-reinforced continuous materials.

OBJECT OF THE INVENTION

It is an object of the present invention to correct the disadvantages of the prior art and to provide a print head for additive manufacturing methods, which permits a particularly easy and efficient cutting of the material, in particular fiber-reinforced continuous filaments.

SUMMARY OF THE INVENTION

According to one preferred embodiment, the invention relates to a print head for the additive manufacturing of fiber-reinforced composite materials, comprising a feed channel, a filament, a heating block, a nozzle and a cutting unit, wherein the filament reaches the nozzle through the feed channel, wherein the nozzle comprises an inlet and an outlet and the filament enters through the feed channel into the nozzle inlet and leaves the nozzle via the outlet and is then deposited on a print bed, wherein the nozzle is attached to the heating block or is integrated with its opening into the heating block, wherein the cutting unit is integrated into the heating block and the cutting unit is configured to cut and/or shear the filament within the heating block.

Positioning the cutting unit within the heating block has proven to be especially advantageous in that the cutting unit can very easily cut and/or shear the filament. The temperature inside the heating block is high so that the filament melts inside the heating block. Since the filament is in a melted and/or paste-like state inside the heating block, the cutting and/or shearing of the filament is made considerably easier.

By contrast, positioning the cutting unit in front of the heating block was standard practice according to the prior art. The reason for this, among other things, was that the cutting unit as additional component could not be installed in the heating block since the activation of the blade via servo motor had to be separate. Electrical components cannot withstand the high processing temperatures of approx. 200°-approx. 450° C. According to prior art, filaments with a low number of individual fibers are mostly used, resulting in a small cross section and resulting low separating forces. With higher filament strengths (3 k, 6 k, 12 k, 24 k, 48 k, wherein the letter k indicates the number of individual filaments in 1000 filament increments, meaning 3 k=3000 filaments, 6 k=6000 filaments etc.) higher separating forces are required to separate the material.

However, the temperature in front of the heating block does not correspond to the melting temperature for the filament. As previously described, it is standard practice to use fiber-reinforced composite materials for the filament. The higher the share of fibers, the more solid, rigid and brittle the material is. And, the more solid, rigid and brittle the material, the more difficult it is to cut this material at low temperatures.

Positioning the cutting unit behind the heating block, meaning after the exit of the filament and thus the material to be printed from the heating block, entails similar problems. A noticeably lower temperature exists outside of the heating block than inside the heating block. Once the material leaves the heating block, it becomes rigid again and cannot be deformed, which again makes the cutting more difficult. The problem for the current prior art is that the filament cross section in the cold state cannot be deformed since the cold filament in that case can no longer be pulled back into the nozzle (cutting after the nozzle) or can be inserted into the nozzle (cutting before the cooling body). When cutting it inside the heating block, on the other hand, the material cross section can advantageously be changed back easier to a round shape following the deforming through the cut by pulling it back through retract into the cold area. A new filament cross section is adjusted as a result of the feed channel geometry, so that it can subsequently move faster since the filament, which is not completely melted, can be guided faster through the nozzle and can shed possible impurities. For the printing process, a slower feed rate is preset, so that a complete melting is possible and a bonding with the print bed or a previous layer is possible.

To successfully cut or shear the material, specific shearing, pushing, pulling and/or pressure forces must be effective. It was therefore completely surprising that the required forces are reduced considerably when positioning the cutting unit inside the heating block. By integrating the cutting unit into the heating block, the cutting operation itself is made easier and the total printing process is accelerated. Physically, this is due to the fact that the filament inside the heating block is already in the melted state, meaning the filament is viscous and can be cut and/or sheared easily.

The placement of the cutting unit inside the heating block has proven extremely advantageous not only for the cutting and/or shearing but also for other aspects of the additive manufacturing, as will be explained with the following example.

A software called slicer is used for the additive manufacturing, which provides a high contribution to the printing process. The slicer functions as facilitator between a 3D model that is input by a user and the 3D printer itself. The slicer converts the input 3D model into a series of thin paths and material layers which arrived on the print bed to produce the component. For this, parameters such as the print head movements and the temperature of the heating block are computed which are then transmitted to the print head or the 3D printer in the form of a G code. The G code, which is also called DIN code, is a machine language by means of which the user tells the machine what to do. Users frequently draw a component to be printed in a 3D printer by using a CAD program (CAD is the abbreviation for computer-aided design). The G code thus is an intermediary between the CAD program and the 3D printer. It was a complete surprise that the calculations made by the slicer were simplified if the cutting unit is located inside the heating block. That is due to the fact that the slicer does not need to consider a long distance between nozzle and cutting edge since the cutting occurs directly at the end of the deposited filament. With slicers used so far, the distance between nozzle and cutting edge (typically approx. 20 to 40 mm) had to be known and the cut was made prior to the path end. The path is generated through resolving a STL file (STL is the abbreviation for Stereo Lithography or Standard Tesselation language) into individual path elements. In the STL format, a 3-dimensional surface is described through triangles with corner points and the surface normal. The number of computations increase noticeably if the distance between nozzle and cutting edge does not coincide with a corner point of the triangles, but falls in-between. This corresponds to the rule that the printed geometry is constructed independent of the cutting unit. For this, the slicer algorithm must break up the straight path into two partial paths to precisely maintain the distance between nozzle and cutting edge. With the invention presented herein, the cut can be made at the end of the path, independent of resolving the STL file. Thus, fewer intensive computing steps are advantageously needed in the slicer and the complete process for computing and printing is accelerated.

It is advantageous that a faster printing process results on the whole owing to the cutting unit being located inside the heating block. The cutting unit thus requires a lower amount of force since the filament inside the heating block is already melting, meaning the cutting unit cuts the filament in a shorter time.

For the additive manufacturing, a typical printing speed of approx. 40 to approx. 80 mm/s has been established. With a printing speed of approx. 40 mm/s, very high quality components can advantageously be printed and/or produced. A printing speed of approx. 80 mm/s can, for example, be used for "simple" components (e.g. components with few and/or less complex geometric structures), in particular if a reduced printing time is desired. Depending on the final speed, the acceleration and jerk, which corresponds to the jolt, is the speed specified without acceleration directly at the start of the movement. These two values are limited especially by the rigidity of the movement unit with motors, by the guides and the drive belts, as well as the rigidity of the print head and the carriage. A high print head weight leads to defects, so-called chatter marks, owing to the stretching of the drive belt. These occur especially at the edges and represent a type of echo of the direction change, which can form as a result of swinging the print head, respectively the movement unit. A good component quality at high printing speeds can be achieved with a preferably very light print head that is compact and thus more rigid and less subject to vibrations. The print head according to the invention advantageously prevents such a sympathetic co-vibration. The printing speed is only one parameter, wherein the output amount in particular limits the printing process since at high speeds more filaments are melted in the nozzle and reach the processing temperature.

When printing with continuous reinforced fiber compound materials, current printing speeds are approx. 5 to approx. 15 mm/s since a good layer adhesion is desired and the contact time between hot strand and cold plane below is decisive in this case, wherein the contact time and/or the layer adhesion is substantially preset by the printing speed. The output amount for a path with reinforced fiber compound material having a layer height, for example, of approx. 0.2 mm and a width of approx. 1.7 mm, as compared to non-reinforced thermoplastic materials with a layer height of approx. 0.2 mm and a width of approx. 0.4 mm to approx. 0.5 mm, is 3 to 4 times greater and must also be considered with reference to the critical output amount.

The inventive device shows one clear advantage which can be seen in the cutting and nozzle replacement or the print head \replacement in a system comprising several print heads, since any saving in the process duration results in a savings in time. Complex components, for example measuring approx. 100 mm in height and approx. 0.2 mm in layer height, can have 500 layers. With 2 materials requiring on the average 1.5 cuts for the reinforced fiber compound per layer, this results in 1250 tool changes or cutting actions. With an approx. 2 s saving per tool change/cut, it is possible to save about 41 minutes during a total printing time of approx. 6 h-8 h (hours).

It is furthermore very advantageous that the total configuration of the inventive print head is very simple since the print head only requires the heating block with therein integrated cutting unit and a feed line for the filament. The preferred installation of the nozzle in the form of a bore in the heating block is particularly advantageous because a very compact heating block can be provided which already accommodates the cutting unit and the nozzle. Additional steps can thus be advantageously avoided during the configuration of the print head. Owing to the compact and small design, the total configuration of the 3D printer can advantageously be reduced. The total size depends on the print bed and the linear rails or shafts and/or motors of the movement unit. A clearance space must additionally be planned between the linear rails/shafts and the print bed if the print head is equipped with several nozzles, so that each nozzle can also reach the print surface. The nozzles not in use and the print head casing here project over the print surface. A smaller total configuration leads to savings in material costs during the production, respectively results in a larger print surface for existing printers which can thus be better utilized.

The movement along one or several axes is advantageously made possible through the linear rail and/or a shaft. A carriage or an axial ball bearing bushing and/or a limit switch for determining the starting position is advantageously installed on the linear rail or the shaft. End stops are preferably used to specify the movement distance. An end stop in this case refers to the desired end point of a motion path.

In addition to the size, the total weight of the print head is also decisive. Especially with multi-material print heads, comprising several nozzles and/or several print heads, the total weight represents the added weight shares of the respective nozzles. A heavy cutting unit with servo motor also noticeably increases the print head weight. With high accelerations of the print head, which are necessary for high speeds, the movement unit and the frame must be configured clearly more rigid and massive. In particular, defects in the component can be generated through elastic stretching of the belt drives and can thus lead to a noticeable reduction in the component quality, respectively the printing speed. The following basic rule applies: the print head and the moving components must be designed to be as light as possible to avoid defects caused by the dynamic processes (acceleration and braking). The components that operate the cutting unit and the heating block for the inventive print head should advantageously be especially lightweight.

The movement unit allows a print head movement along a straight line, a plane and/or a three-dimensional space. For example, a print head can move along the x-y plane for generating the print layer. The movement unit comprises drive motors, a belt drive, an axial guide with linear rails and/or shafts and includes end stops for determining the origin and frequently also end stops for a defined movement length.

One or several belt drives function to transmit power and movement, by means of a flexible toothed belt and drive cams arranged between the motor and the moving axle, respectively the carriage.

So-called heavy tows can furthermore be printed by installing the cutting unit in the heating block. Heavy tows are particularly thick rovings, comprising approx. 48000 (48 k) and up to 100000 filaments. A roving is a fiber bundle consisting of individual fibers since the individual fibers have a diameter of 7 μm (micrometer) and are thus approx. 10-15 times smaller than a human hair. It is particularly easy to cut the heavy tow with the cutting unit. The invention bypasses the difficulties when cutting such thick strands in that the cutting unit is located inside the heating block.

The print head is one of the important components of each 3D printer. It originally designates the component of the 3D printer within which the filament flows and through which the filament is finally deposited in several layers onto the print bed. These components (mostly considered as a whole) are also referred to as hot end, since a processing at temperatures above the melting temperature or the softening temperature is required for thermoplastic polymers. The print head can be equipped with one or several heated nozzles. In each nozzle, a different material and/or the same polymer having a different color can be processed. Also possible are combinations of several material feeds to one nozzle or the mixing of the individually supplied materials. Several individual print heads can also be integrated into the 3D printer, wherein this is called a tool changer. The active print head only is moved and the other print heads remain in the stationary position until, during the tool change, the old print head is set down and a new print head is picked up. The active print head in this case is the print head which prints material on the print bed while the other print heads are not printing. A relative movement advantageously occurs between the print head and the print bed onto which the material is to be printed. The material to be printed is deposited in the horizontal plane of the print surface by the horizontal (respectively parallel to the print surface) movement components. Vertical movement components (respectively perpendicular to the print surface) control the depositing in height (perpendicular to the print surface) and thus specify the layer height. The print head advantageously includes in particular an output region where the printing material is deposited on the print surface corresponding to the work piece to be printed. The nozzle specifies the width of the path, wherein the rule applies: extruding width is equal to nozzle width. Depending on the slicer and the algorithm, approx. 120% of the nozzle diameter are also used for the extrusion width. Besides this element, the print head can also comprise other elements which, for a functioning print, must definitely be placed in front of the output region, for example a sensor for monitoring the deposited paths, a cutting unit for fiber-reinforced continuous filaments, or elements for a tool change, respectively an activation change, or activation elements for several nozzles.

The 3D printing is synonymously also called additive manufacturing or generative manufacturing. In this connection, we especially want to mention the so-called fused deposition modeling (FDM or melt-layering) or fused filament fabrication (FFF). According to DIN standard 17296-2, the process is referred to as material extrusion, meaning a production method where a workpiece is produced in layers from a meltable plastic. Above all, this refers to the printing with a fiber-reinforced composite material comprising a reinforced fiber (short fibers approx. 50 μm-500 μm; long fibers approx. 500 μm-approx. 100 mm, or endless fibers>100 mm) in a polymer matrix. A polymer matrix is preferably also called a plastic matrix.

A 3D printer refers to a device for realizing the 3D print or the additive manufacturing process. 3D printers are used in the industry, for model making and for the research to produce models, patterns, prototypes, workpieces, end products and for private use. In addition, they are used in the home and entertainment area, for the construction, as well as for the arts and medicine.

A fiber-reinforced composite material preferably includes reinforcing fibers, e.g. carbon fibers, and a polymer or plastic matrix, which infiltrates the fibers. The plastic matrix and/or polymer matrix refers to a material that comprises polymers with therein embedded fibers. Since the fibers advantageously have a higher rigidity than the matrix, impacting loads or forces are preferably conducted along the fibers, thus advantageously increasing the total stability of the reinforced fiber composite material. With the same elongation between fiber and matrix, the higher rigidity results in clearly higher tensions in the fiber. In case of a fiber break, the component fails catastrophically since the fibers are frequently very brittle. In case of a matrix failure, the fibers cannot be supported any longer and a stress-dependent failure type occurs.

A fiber in particular is a linear, elongated object consisting of a fiber material, which has a fiber form, wherein the longitudinal shape is smooth or frizzy, for example, and the cross-sectional shape is round or square. The term fibers above all refers to thin threads with a diameter of preferably several micrometers. For example, the diameter for carbon fibers according to prior art is approx. 7 μm, wherein commercial fibers with a smaller diameter (e.g. approx. 5 μm) are also available. Thicker or thinner fibers are also known and can be used.

Fibers can preferably also take the form of yarn. In that case, fibers of different lengths are in particular twisted, torn or braided. Besides the yarn, the fiber bundle can also be not twisted and is then referred to as a roving, respectively a fiber bundle. The plastic material preferably can comprise a thermoplastic, a thermosetting and/or an elastomeric material. Thermoplastic materials are easy to process. Thermosetting materials are especially stable even at high temperatures and above all cannot be deformed under the effect of heat. Elastomers in particular have a high conversion ability and higher energy adsorption.

The thermoplastic material can be based on polymer types such as the group of polyamides (PA12, PA11, PA6, PA66, PA666, PA610, PA612), PLA, PLGA, ABS, SAN, ASA, SB, PS, PE-LD, PE-LLD, PE-HD, PE-UHMW, PP, PB, PIB, PBT, PET, PETG, PC, PMMA, POM, as well as thermoplastic elastomers (TPE) and thermoplastic polyurethane (TPU), their dry blends, polymer blends and/or their compounds. Cross-linking agents for a better adherence to the fiber; flame-retardants, color and effect pigments are considered additives for improvement, along with additives for improving the electrical and thermal conductivity. The fibers used are carbon, glass, basalt, aramid, Kevlar, lignin, flax, hemp, sisal, jute and/or wood fibers. Individual fibers or several fibers simultaneously can be transported into the nozzle to increase the output amount and create combinations of so-called fibers. A thread-type sensor or non-reinforced thermoplastic material can also be inserted with the endless filaments to increase the matrix share; see FIG. 9.

The bonding between fibber and matrix is improved by the fiber surface and the sizing. The fiber surface is frequently activated through oxidation, which can be realized with acid baths, plasma or similar processes. The sizing is a protective layer for the manufacturing processes to prevent destruction of the fibers. The composition of the sizing also permits a better fiber-matrix bonding. An epoxide resin sizing bonds well with epoxide resin. However, the bonding can be reduced through degradation or decomposition at high temperatures, such as the processing temperatures for thermoplastic polymers. For that reason, special sizing materials are offered commercially for thermoplastics.

The plastic, respectively the polymer, can consist of resin and/or hardener. Condensation resins as well as reaction resins can be used. In contrast to the first, the polymerization or poly addition occurs solely through hardening. As a result, damage to the health of persons participating in the production can advantageously be avoided.

Hardeners or curing agents are preferably understood to be materials resulting in a solid plastic, in particular when used jointly with the resin. Hardeners are preferably selected from the group polyamines, amine adducts, poly aminoamides, ketimines, poly isocyanates, blocked isocyanates, cyanguanidin, amidines, anhydrides of dicarboxylic acid, carboxy group-containing polyester resins, dicarboxylic acids, aldehydes, ketones and/or divinyl benzenes, diallyl phthalates, and/or triglycidyl isocyanurates. The aforementioned hardeners advantageously have good mechanical characteristics, as well as good temperature resistance and chemical resistance and are considered high quality. Among other things, they are used as imbedding means in the metallography and as molding materials for components in the electro-technology and the electronics.

The filament is preferably transported through the feed channel to the print head. In the simplest case, the feed channel can be a tube-type recess (volume) which essentially leads straight to the heating block of the print head. The feed channel can also comprise a tube or tube-type envelope through which the filament is guided and conducted. The feed channel here preferably is a tube consisting of PTFE (polytetrafluoroethylene) to protect the printing material and stress the material only along the cutting edge. PTFE is advantageously very inert, so that a plurality of materials can be used for the filament. It is advantageous that most substances cannot break up the PTFE bonds and react chemically with PTFE. In addition, PTFE has a very low frictional coefficient which is advantageous for the feeding, respectively the flow, of the filament into the heating block. The static friction and the dynamic friction are furthermore the same for PTFE, so that the transition from standstill to movement occurs without jerking. PTFE furthermore has a low surface tension so that materials rarely stick to PTFE, which is a great advantage for the PTFE flow through the feed channel. PTFE furthermore has a melting temperature of approx. 327° C., with a type-dependent use temperature of approx. 250° C. or more, so that PTFE is particularly well suited for the transfer of the filament into the heating block. Analogous to the term “feed-in channel,” the terms “feed channel,” “conducting channel,” “conveying channel” or “guide tube” can also be used.

Terms such as essentially, approximately, and the like describe a tolerance range of less than ±40%, preferably less than ±20%, especially preferred less than ±10%, and in particular less than ±1% and comprise in particular the precise value. “Similarly” describes preferably quantities which are approximately equal. “Partially” describes preferably up to at least 5%, even more preferred up to at least 10% and especially up to at least 20% and, in some cases, up to at least 40%.

The filament is the material used for the 3D printing which, in the final analysis, is used for producing the components. The material preferably is a plastic polymer, for example polyactides (PLA), acryl nitrile-butadiene-styrene-copolymers (ABS) and/or polyethylene terephthalates modified with glycol (PET; with glycol PETG). This material is melted at high temperatures, especially in the heating block for the print head. High temperatures here refer to temperatures above the room temperature which are essentially at a melting temperature for the filament. These temperatures in particular must be present in the heating block. The filament is preferably available in elongated form, e.g. in wire form, and/or is wound up on rolls. For example, the filament can be rolled up on a spool and supplied via a simple mechanical device to the feed channel. The filament is preferably moved and/or supplied with the aid of a drive, e.g. a stepping motor. The filament substantially determines the characteristics of the 3D print. If it is described in the following that the material is cut and/or sheared, this preferably refers to the filament. In particular, the cut made by the inventive cutting unit refers to fiber-reinforced, continuous filaments, but is not restricted to these. The cutting and/or shearing of filaments that are not reinforced or contain short fibers is not standard practice since the melted strand in that case can be separated through a retract once the nozzle moves at high speed to the following position. However, a separating via the retract is no longer possible with a large number of fibers, especially fiber-reinforced, continuous filaments, since the tensile strength of the material is too high (see the explanations on page 2 for this). Within the context of the printing process, the formulations "material" and "filament" are used analogous.

The heating block is a fixed component of the print head and designates the area where the filament is heated to the melting temperature. Depending on the material, the temperatures range from approx. 100° C. to approx. 500° C. The increased temperature for melting the filament is advantageously distributed homogeneously by the heating block. The heating block in most cases is manufactured from aluminum. Other materials can also be considered, such as brass, steel, bronze, copper and/or titanium. It may also be preferable to install one or several heating cartridges and/or temperature sensors in the heating block. It is furthermore preferred if the heating block is designed for accommodating the heating cartridge, the temperature sensor, the nozzle and a heat break. The heating cartridge provides the heating block with an increased temperature, so that the filament melts inside the heating block. The heating block temperature can be monitored with the temperature sensor and the values transmitted to a computer unit. In the prior art, it is standard practice for the heating cartridge to be clamped in, screwed in or glued in with heat-resistant adhesive or silicone in the heating block. These options for attaching the components are within the scope of knowledge of the average person skilled in the art. The heat break advantageously designates the region that connects the heating block with the cooling body which preferably can also be installed. The heat break preferably interrupts the heat transfer from the heating block to the cooling body, so as to result in the lowest heating loss. To achieve this, the wall thickness is noticeably minimized, resulting in a smaller cross section for the heat transfer. Materials with lower heat conductivity are furthermore used for this region (e.g. titanium or ceramics) to reduce the heat conductivity. The transition from the solid to the liquid phase of the filament advantageously occurs in the heat break region. It is preferable, if possible, for the temperature in the cooled region, especially in the region of the cooling body, to be below the glass transition temperature, respectively the material-typical temperature, to avoid a plastic deformation. Amorphous thermoplastics are solid below the glass transition temperature. Above this temperature they become thermos-elastic and then thermoplastic. In particular it means that above the glass transition temperature, these materials deform and can cause a clogging of the print head. A similar temperature range exists for semi-crystalline plastics which, however, is closer to the melting point and is defined differently in the prior art. On the whole, the filament must be cooled down enough, so that no deformation occurs since otherwise the pressure for the material conveying becomes too high.

The nozzle preferably functions to deposit the fiber-reinforced compound material in a controlled manner on the print bed. A nozzle preferably comprises an opening in the direction of the print bed for the printing material. In particular, the nozzle can have an outlet cross section that narrows down for the thermoplastic material to be printed. A narrowing of the cross section is not possible with a fiber-reinforced material with continuous carbon fibers since a plastic deformation of the material is not possible in the cross section without the fibers being damaged through compression or stretching. It is possible that the nozzle cross section is larger for continuous, fiber-reinforced compound materials than the internal guide through the feed channel since additional stress of the fibers must be avoided, which is caused by the deforming of the cross sectional shape from round (e.g. diameter of 0.7 mm) to a wide elliptical shape or a wide rectangular shape with rounded edges (e.g. layer height of 0.2 mm and width of 1.7 mm for the printing path). The nozzle inside edge can be rounded (typically approx. 0.5 mm-approx. 1 mm radius) to avoid a tearing or grinding down of the fiber strand. The nozzle tip itself does not have to be pointed but can also be a surface that is perpendicular to the guide channel by means of which the reinforced fiber compound material is pressed against the surface, thus making possible a heat transfer. The outside edge of the nozzle can have a sharp edge or be rounded. The latter is frequently used advantageously so as not to damage or unravel the surface of the deposited reinforced fiber strand.

With unreinforced or short-fiber reinforced filaments, a narrowing outlet cross section is an advantage in that a more targeted printing of the material is possible and thus patterns, indentations, forms and the like can be applied more systematically onto or into the component. A larger diameter, e.g. 1.75 mm or 2.85 mm can clearly be produced easier owing to the tolerances. In addition, the filament can in this way be inserted easier into the print head with the aid of a conveying unit, also called an extruder, and the heated nozzle.

The nozzle can advantageously also be inserted as an opening into the heating block. The opening can have a round, edged, tapered and/or widening cross section. A widening cross section is advantageous since the material can be applied more wide-spread onto the print bed. Round and edged outlet cross sections advantageously allow a shaping of the material directly at the nozzle outlet, thus accelerating the applying of patterns since a long dwell time of the nozzle above a specific position can be omitted. The nozzle thus can preferably be present in the heating block as an opening, for example a bore hole. In this way, an especially compact print head can be made available. Installing an additional component as a nozzle can advantageously be omitted during the configuration of the print head. When installing a nozzle as additional component, particular attention must be paid that the nozzle material is consistent at the heating block temperatures. No such considerations are required when installing an opening in the heating block for the nozzle. As a result, the configuration and design of this embodiment saves time, energy and costs.

It can also be preferable if the nozzle is integrated as additional component into the heating block to release the material onto the print bed. A nozzle functioning as discharge region, which approaches a print surface for the printing, respectively is located there, has proven to be especially suitable for the FMD/FFF printing. The nozzle and/or the print bed are preferably configured so as to permit a relative movement between nozzle and print bed, in particular in all spatial directions. A relative movement can preferably be achieved through moving the nozzle as well as moving the print bed and especially through moving both elements relative to each other. The possible spatial directions preferably comprise rotatory, respectively rotational, degrees of freedom in addition to the translatory degrees of freedom, which permits a printing of complex, three-dimensional components. A degree of freedom refers to the number of independent and thus freely selectable movement options along a spatial direction. A spatial direction, in particular, refers to a coordinate axis in a three-dimensional space and therefore comprises especially the x, y and/or z axis.

In particular, the nozzle comprises an inlet and an outlet. The nozzle inlet comprises the region where the material to be printed, meaning the melted filament, enters the nozzle. The inlet can also be referred to as nozzle inlet edge. The nozzle outlet comprises the nozzle region through which the material travels to reach the print bed. The inlet and outlet of the nozzle in particular are functionally defined. An average person skilled in the art can allocate these accordingly or can give these regions different terms.

The cutting unit preferably is a tool for cutting to length and/or cutting up the fiber-reinforced compound material. The cutting unit can be moved in the direction of the filament, so that the filament is cut at a desired location and/or in a desired region, preferably in transverse direction. For example, it is advantageously possible with the cutting unit to insert several reinforced regions in a layer, to print two components without direct connection, or also to insert predetermined breaking points. The cutting unit advantageously permits manufacturing complex components, for example with local reinforcements.

The cutting unit preferably cuts and/or shears the filament before it is printed on the print bed, wherein the cutting unit realizes a shearing movement that causes a shearing of the material by exerting a force in transverse direction. The cutting unit movement for this can be linear, through an axial radial movement, or a rotational movement, for example with a rotating drum. However, for cutting the print material it may be preferable if the complete print head or the feed channel, the heating block, and the nozzle (essentially together) carries out a rotational movement to shear off the material.

Cutting the material preferably refers to separating a piece from the rest of the material. A shearing refers to the effect of a force, or a force pair, parallel to the covered surface onto the material, so that it results in deformation with additional tension components. The expression shearing force or thrust is customary for this. The force pair can develop from the effect of an offset pair of forces acting upon the material which leads to a distortion (thrust distortion) of the area located between the forces. The force pair comprises two forces which are effective in opposite directions and are parallel to each other. In particular, a cut can result from the material shearing. The force pair can also be caused by a moment acting upon the material (rotational moment).

The print bed refers to the print surface onto which the material is deposited for producing the component and is thus printed. The print bed preferably is a component platform and is embodied as a plane. For other applications, the print bed can also have indentations and/or impression models to make it easier to obtain desired forms. It can be preferable for the print bed to be heated, wherein the print bed can furthermore advantageously have segments which are heated differently. Already printed layers can advantageously bond faster and better with the new print material since they have nearly the same temperature. Otherwise, the already printed material would harden too quickly, resulting in the danger that already printed layers are damaged. This is advantageously be avoided by adapting the temperature between the print material and print bed.

Such measures are within the scope of knowledge of the average person skilled in the art and can be optionally adapted and optimized, depending on the application and use.

According to a different preferred embodiment, the print head is characterized in that the cutting unit is located within a distance S to the nozzle inlet wherein S essentially measures from 0 to 100 mm, preferably up to 10 mm, and especially preferred up to 1 mm.

The preferred distance of up to approx. 10 mm and especially the preferred distance at approx. 1 mm is an advantage because in the slicer only a short distance must be considered between the nozzle outlet and the cutting unit. This is particularly true for a distance of approx. 1 mm since the cutting operation occurs directly at the path end. A path within the meaning of the invention refers to the path of the filament until it reaches the nozzle. The end of the path essentially designates the region of the nozzle outside edge and thus the nozzle outlet. Owing to the short distance between nozzle outside edge and cutting unit, intensive computing steps in the slicer, which require the distance between nozzle outside edge and cutting edge, are simplified and accelerated. This advantageously affects the complete printing process, so that the complete printing process occurs faster.

The aforementioned distances have proven to be especially advantageous for permitting an optimum cut of the filament. For this, the cutting unit is located inside the heating block. Depending on the use and selection of the heating block, it can have different dimensions, for example a height of approx. 100 mm, approx. 50 mm, approx. 20 mm, approx. 10 mm or less. Thus, it is essential for the invention that the distance S, the distance between nozzle outlet, respectively nozzle edge, and the cutting unit is less than these dimensions, preferably less than the heating block height since, according to the invention, the cutting unit is to be integrated into the heating block.

The distance S (see FIG. 1, reference 8, respectively parameter S) advantageously should be positive and not negative, meaning not less than 0 mm (e.g. not 0.5 mm), within the reference system for the invention. If S had a negative value, the cutting unit would be outside of the nozzle and a cut would be made only after the material leaves the nozzle. However, the inventors realized that such a position makes cutting the filament more difficult since the filament has already hardened somewhat after leaving the nozzle. The distance S simultaneously cannot exceed the dimensions of the heating block since the cutting unit would then no longer be inside the heating block, resulting in the problem that the cutting unit would be in the region of the heat break or even in the cooling body. The invention would not function in said region since the inventive idea of placing the cutting unit within the heating block would not be realized. In reality, the filament does not reach the melting temperature outside of the heating block, meaning the filament has a relatively high hardness which makes it more difficult the cutting and/or shearing by the cutting unit.

It can also be preferable that the distance S=approx. 0. The distance S=approx. 0 means that the cutting unit, more precisely a cutting unit edge, is essentially at an identical position as the nozzle inlet, thus permitting a cut of the filament at the end of the path. In particular, the cutting unit itself is heated since it is located inside the heating block. Clearly less force is advantageously required to cut and/or shear the filament. On the one hand, the reason for this is that inside the heating block the filament is in a liquid, viscous or paste-like phase. On the other hand, the temperature of the cutting unit itself is raised because it is inside the heating block and has a similarly high temperature as the heating block due to the heat transfer. Owing to the combination of the liquid phase within the heating block and the increased temperature of the cutting unit itself, it was surprising that considerably less force was required for the cut than would have been expected, given the sum of these favorable factors.

According to a different preferred embodiment, the print head is characterized in that the cutting unit has one or several radially movable cutting discs or a rotating drum. The cutting operation preferably occurs through radial movement or a rotational movement of the cutting unit. The radial movement exerts an aggressive load onto the material, thereby causing a radial load to be exerted onto the fiber-reinforced continuous filament, thus causing internal stresses in the material in radial direction, respectively with a radial component. The resulting normal stresses, especially tensile and pressure stresses, advantageously affect purposely the respective cross sections of the material. A rotating movement of the cutting unit is also advantageous since the printed material and thus the produced component can be worked precisely with respect to dimensions, shapes and roughness.

For a se radial movement, the cutting disc is preferably moved in linear direction. In the process, a first cutting edge is moved toward a second cutting edge, or the second cutting edge can preferably also move toward the first cutting edge. It is furthermore preferred if both cutting edges move toward each other. For the last-mentioned variant it is especially preferred if both cutting edges move counter-rotating or that one cutting edge moves faster than the other one. As a result, both cutting edges overlap, thereby permitting a cutting and/or shearing of the material.

For the linear-movable discs, all types of materials can be considered which have a much higher melting temperature than the temperature inside the heating block. The material can furthermore be hardened or can be provided with hard, wear-resistant or gliding coatings to reduce the separating forces.

The cutting unit can also be embodied as a rotating drum. For this, the filament is transported through the feed channel into the heating block which contains the rotating drum. The feed channel can preferably also transport the filament into the rotating drum. The rotating drum also comprises one or several cutting edges. The nozzle inlet can be closed off by the rotational movement, respectively the movement of the rotating drum, so that a cutting and/or shearing of the filament is possible.

Materials that do not melt at the temperatures present in the heating block can also be used for the rotating drum. The metals that can be used, for example, are tungsten, molybdenum, tantalum, titanium, niobium, steel, iron, brass, bronze, aluminum, copper and their compounds and/or alloys. Ceramics can also be used as material for the rotating drum, such as aluminum oxide, zirconium oxide, silicon nitride, aluminum nitride, silicon carbide, cordierite, mullite, steatite, calcium oxide, magnesium oxide, sialon, Pyrex, Tempex (Styrofoam), Neoceram, quartz, Baycol, sapphire glass, brick, their compounds and/or alloys. The aforementioned materials for the cutting unit and/or the rotating drum are especially advantageous since the cutting edges in particular retain their sharpness over a long period of time. The sharpness can furthermore be improved through processes such as hardening and/or tempering with a wear-resistant layer and/or a gliding layer and the use period can be extended. From a production-technical view, it is also a great advantage since a frequent changing of the cutting unit can be omitted.

The rotating drum diameter has turned out to be an important parameter for the cutting operation. A small rotating drum diameter, in particular, reduces the heating block size, but results in large rotational angles. The rotating drum diameter does not change the cutting length since the cutting always takes place along the edge near the nozzle. The remaining draw length is defined by the distance between nozzle edge and cutting edge. However, with small diameters, the drum must be turned further so that the open channel can be closed. The rotational angle thus increases strongly with smaller drum diameters. Larger rotating drum diameters result in smaller rotational angles, which are necessary to cut the filament. It is therefore preferred if the drum diameter measures up to approx. 100 mm, especially preferred up to approx. 50 mm, and even more preferred up to approx. 10 mm. A diameter of approx. 10 mm advantageously represents a good compromise between the size of the heating block and the rotational angle to be used, which should preferably be between 15° and 30°. Rotational angles between 10° and 45° are also possible with the rotating drum. For some applications, rotational angles between −90° and +90° are possible. Smaller rotating drum diameters of up to approx. 4 mm are furthermore conceivable, wherein it must be ensured that the wall thickness along the cutting edge of the rotating drum is not too thin with extremely small diameters. This depends on the inside diameter of the feed channel which can measure, for example, approx. 1 mm. If the inside diameter of the feed channel is reduced, the rotating drum diameter can be reduced to approx. 2 mm. To achieve these rotational angles, little force is advantageously required to start the cutting unit. The indicated angles advantageously are sufficient for closing off the nozzle inlet. By closing off the nozzle inlet, a "complete cut" is made, meaning the material is separated, resulting in a brief stop of the material printing. For example, this can be relevant if the printing is supposed to stop at a certain position and the print head must change its position. During this position-change interval, no material should be extruded onto the print bed. This is advantageously achieved in that the rotating drum can close off the nozzle owing to the specified rotational angles. At the same time, it is possible to shear only a portion of the material with the specified angles, for example to obtain specific patterns and/or forms on the print bed.

The rotating drum diameter also depends on the diameter at the nozzle inlet. For this, a bore with preferably conical shape is advantageously inserted into the rotating drum itself. For example, the conical bore can have a diameter of approx. 1 mm wherein for a conical bore, an offset of approx. 1 mm advantageously forms between nozzle and rotating drum. The advantage of this offset is that a cutting edge of the rotating drum does not come in contact with the feed channel. At the end of this offset, the material is cut and/or sheared at the cutting edge between the rotating drum and the nozzle. For the invention it was recognized that a "straight" bore in the rotating drum is not advantageous since the feed channel could be sheared off through the rotating movement of the drum, which would be a disadvantage in the case of a PTFE tube as feed channel. The PTFE tube could otherwise be damaged by the shearing via the mechanical stress. The solution to this problem is the conical bore in the rotating drum and/or a groove, so that the edge located opposite the cutting edge, between the heating block and the rotating drum, does not come in contact with the tube or the reinforced fiber, continuous filament (see also FIG. 8 and the associated description). Thus, only the material, respectively the filament, is advantageously cut off and there is no contact between the edge and the feed channel.

According to a different preferred embodiment, the print head is characterized in that the cutting unit comprises a cutting bore, and that the cutting unit as radially movable disc has a rectangular, trapeze-shaped, conical or semi-circular cross section, wherein the nozzle inlet can be closed off through a movement of the cutting unit (see also FIG. 2). For this, the cutting disc must be moved radial to the filament through radial displacement. A radial movement preferably refers to a movement in a radial direction. For a rotating movement, a rotation around an axis is realized. The movement of the axis of the disc must be radial to the filament, respectively with a radial share, since the cutting edge would split the filament in case of a movement that is oriented axially to the filament. In particular, the cut is made perpendicular to the center line of the filament and thus in radial direction if we assume that the filament cross section is a circle. Realizing radial cut would mean a cutting perpendicular to the circular plane and the filament would be cleaved and not cut.

The cross-sectional shapes of the radially movable disc as a rectangle, a trapeze, or a circle have proven to be advantageous in that the filament can be moved particularly easily and simply through the cutting bore of the radially movable disc.

As a radially movable disc, the disc is moved linearly in transverse direction to cut the filament inside the heating block. The nozzle inlet can be opened and/or closed through the movement of the radially movable disc. By closing the nozzle inlet, the material is cut and/or sheared. As a result of the placement inside the heating block, this is particularly advantageous because the filament is melted by the increased temperature within the heating block. Surprisingly little force is thus needed for cutting and/or shearing the material with the radially movable disc.

The cutting bore can take the shape of a standard bore or can be inserted as conical bore into the radially movable disc. It should be considered for the bore that the material is cut only at the cutting edges, but not when entering the radially movable disc. That is why the conical bore is especially preferred for the radially movable disc as cutting unit. The conical bore (see FIG. 2) advantageously prevents that a cut is made by the radially axially movable disc at the entrance since an upper edge of the radially movable disc does not come in contact with the material. For the embodiment of the cutting unit as radially movable disc, the feed channel can also be a tube, for example a tube comprising PTFE (PTFE tube). Closing off the nozzle inlet corresponds to cutting or shearing the material before it travels through the nozzle and onto the print bed.

According to a different preferred embodiment, the print head is characterized in that the rotating drum carries out a rotational movement, so that the filament is cut or sheared through the rotational movement, wherein the rotational movement comprises an angle of up to approx. 50°, preferably up to approx. 30° and especially preferred up to approx. 20°. These values are advantageous in that they can close off the inlet completely or partially for cutting and/or shearing of the material. Excessively large angles would be unsuitable since these would entail the danger of losing control of the rotational movement. In addition, with large rotational angles and a lever, the print head dimensions would have to be enlarged to avoid collisions with surrounding elements. The aforementioned angles thus advantageously represent a balance between the rotational movement and the dimensions of the rotating drum, wherein this is also determining for the size of the heating block. If the rotating drum has rather small dimensions, the heating block can also be designed smaller. The amount of material that can be cut or sheared is correspondingly reduced. A larger rotating drum reduces the angle options which can be reached with the rotating drum. The values provided advantageously represent a compromise between the size of the rotating drum and thus the heating block and the rotational angles that can be achieved. The rotational movement of the drum preferably causes mechanical tension. The material is sheared in this way, wherein this has the advantage of being especially easy since the acting force is low owing to the placement of the rotating drum inside the heating block.

According to another preferred embodiment, the print head is characterized in that a temperature of up to approx. 400° C., preferably up to approx. 300° C. and especially preferred up to approx. 200° C. is present in inside the heating block, so that the filament is melted inside the heating block. The processing temperature is higher than the melting temperature since for the 3D printing a higher temperature favors the plasticizing process as well as the adherence to the layer below. The melting temperature appears as temperature point value for partially crystalline polymers; analogous there is a temperature range for amorphous polymers in which the material transitions from the thermo-elastic to the thermoplastic range. The heating block temperatures can be adapted and optimized, depending on the material. It is conceivable in that case that when using PEEK (polyether ether ketone), temperatures of approx. 450° C. are used. However, lower temperatures can also be used, for example when using thermoplastic epoxide systems which require approx. 80° C. It is surprising here that with the indicated temperature ranges, the broadest possible material spectrum can be used for the filament and can be made to melt inside the heating block. In particular, the temperature inside the heating block can be regulated, for example by installing heating cartridges and/or temperature sensors. Varying the temperature inside the heating block for specific components is also conceivable, for example if different filaments must be used that respectively comprise materials with differing melting temperatures. Inside the heating block, the filament assumes a liquid or paste-like state, which considerably facilitates the cutting or shearing of the material as compared to the prior art. The filament can have differing viscosity, depending on the temperature and material, which can also influence the flow speed of the material and thus the general printing speed of the printing process.

The processing temperature designates the melted polymer temperature for the processing and depends among other things on the extrusion speed, the extrusion amount, and the nozzle temperature since the polymer must absorb energy until it exits the nozzle. With slow printing speeds and thus low extrusion amounts, the polymer has sufficient time to absorb the energy and reach a similarly high temperature as the nozzle temperature. With high printing speeds, the extrusion amount is clearly higher and the polymer flows faster through the hot regions. If the flow speed is too high, the energy amount must to be considerably higher so that the complete material can be heated. That is why the nozzle temperature is increased at high printing speeds, as compared to slower printing speeds. One example to be mentioned is PLA (polyactides) where a nozzle temperature of approx. 210° C. is used for a speed of approx. 60 mm/s, but where at a speed of approx. 80 mm/s the temperature is increased to approx. 215° C.-approx. 220° C. The main problem here is that the needed energy amount can be computed, but that the energy feed in the 3D printer can be adjusted only through a constant nozzle temperature. For static processes (constant speed) that is sufficient, for dynamic processes (strong differences in the speed components, particularly in the vector notation for the speed), however, this results in different temperatures in the polymer.

One skilled in the art can select different heating blocks from known manufacturers according to the prior art. For example, a heating block comprising aluminum can be selected, having dimensions of approx. 20×20×10 $mm^3$. Critical with respect to the size of the heating block is that sufficient volume exists on the inside, so that the cutting unit fits inside. It is furthermore important that the heating block material is constant at the temperatures present therein. The heating block can also comprise different threads, for example to accommodate heating cartridges and/or sensors. The heating block can also contain threads which are suitable for feeding in the tube used as feed channel. These measures are within the scope of knowledge of the average person skilled in the art and are therefore not described in detail.

The print head of a different preferred embodiment is characterized in that the print head comprises a cooling body, wherein the cooling body spatially surrounds the filament prior to the transition of the filament into the heating block. The cooling body can be designed in the most different variations and functions to keep the filament cool. As a result, the filament advantageously does not liquefy too quickly. The cooling element allows actively promoting a cool-down of the reinforced fiber material, e.g. to achieve a better transport of the filament through the feed channel. For example, a cooling body can be a passive cooling element that is essentially formed by a cooling body provided with ribs for the cooling. Such ribs (also called cooling ribs or cooling fins) serve to increase the surface for improving the heat transfer to the surrounding area and thus the cooling. These ribbed surfaces can be part of the print head itself or can also be designed as a separate component. The cooling body in turn can be in direct contact with the heating block or can be connected via an additional medium to the heating block. The reinforced fiber compound material is guided inside the cooling body and is preferably cooled in the process. However, it may also be preferable if the cooling body allows an active cooling, e.g. through a cooling Peltier element. The cooling body can be cooled with water or other liquids. Cooling is also possible with a ventilator, for example an axial ventilator or a radial ventilator.

The print head of a different preferred embodiment is characterized by a retract in the print head. The retract is a functional sequence following the completion of the printed path or the cutting operation. The slicer preferably co-determines the movement of the retract. In particular, predetermined processing steps of the retract can thus be transmitted and/or input via the slicer, wherein this advantageously leads to a reliable and secure printing of the component to be produced. In particular, this prevents excess material from reaching the print bed, which is especially desired for the production of complex components and/or structures.

The term "retract" comes from the English word "retraction" and means pulling back or pulling in. For this, the filament is pulled back into the print head via the movement of a conveying gear, thereby reducing the pressure in the nozzle, so that the melted filament no longer exits the nozzle. The retract thus comprises the movement of the conveying pair for pulling back the filament. This is preferred if the print head changes its position and therefore does not print, respectively no material is extruded from the nozzle to the print bed. It was surprising that using a retract in the inventive print head ensures a better conveying of the fiber-reinforced, continuous filament. With the retract, the material is pulled back into the cooled region, can cool down, and does not bond with the PTFE tube or the metal conveying channel. When restarting a new path, the material can be conveyed faster through the nozzle, can then be welded or bonded through melting of the compound material to the start of the new path, and the material can be printed with the aid of the conveying drive and through bonding with the building platform or the last printed layer. Since the material is no longer liquid or in paste form due to the retract, a plugging of the nozzle and/or the cutting unit can be reduced. Advantageously, no excess material reaches the print bed or the component to be printed. Otherwise, various details of a component would not be precisely reflected. Thus, installing a retract has a positive effect on the component quality and the total printing process.

The mating gear can be part of the mechanical system, respectively the conveying unit, that conveys the filament into the feed channel. In particular, the conveying unit for conveying the filament into the feed channel comprises a conveying gear, wherein this conveying gear can be actively operated with a stepping motor. Pressure can be built up between the filament and the conveying gear in that a mating gear presses the filament against the conveying gear. It is also possible to actively operate the mating gear, for example with a parallel-switched stepping motor or a gear assembly, such as is the case for a so-called dual-drive. The conveying gear can furthermore be integrated into the conveying unit as a gearwheel, a cog wheel or a profiled wheel composed of metals or flexible polymers.

To produce a successful and clean 3D print, it is very important to be able to print a precise amount of filament at the correct time at a specific position. Reversely, it is equally important that no filament leaves the nozzle at the moment when no filament is needed. This precise interaction of the components is influenced by several factors (e.g. temperature, filament retract, cut of the filament). If the settings are not calibrated precisely, threads or drops can form on the printed object or the print bed.

In addition, various adjustments are made for this in the slicer, especially regarding the filament retraction distance, the filament retraction speed, the temperature and the movement speed of the print head.

With the filament retraction distance, it is preset in the slicer how much of the material in millimeters is to be retracted. This adjustment is advantageous for all print head movements carried out by the printer without simultaneously constructing the component. This can be the case, for example, when moving from one component to the next or from one component wall to the opposite one. If the selected distance for the filament retract is too long, not enough material is available when the printer again builds the component. However, if the distance is selected to be too short, filament drips from the nozzle at a point in time when the filament should not leave the nozzle, resulting in the typical thread forming if the print head moves from one component end to the next. The ideal distance for the filament retraction differs from printer to printer and from filament to filament. Prior art uses as the rule of thumb:

direct extruder and slow-moving material need less distance (approx. 1-2 mm) than Bowden extruders and fast-flowing material (approx. 4-8 mm).

The retraction speed preferably determines how fast the filament is pulled back from the nozzle. If the retraction speed is selected too slow, the filament is removed slower from the nozzle than the simultaneous dripping downward. If the retraction speed is selected too fast, the filament can tear. In the prior art, values between approx. 1200 to approx. 6000 mm/min, respectively approx. 20 to approx. 100 mm/s have proven advantageous (millimeter per minute or millimeter per second). The aforementioned retraction speeds advantageously form a suitable compromise for preventing additional dripping but also tearing of the filament. The optimum value varies, depending on the filament used and the printer configuration. Insofar as no suitable standard configuration exists in the slicer for the material and printer combination, the ideal result can be adjusted by making small changes to the retraction speed.

The temperature at the heating block is also an important parameter for the retract. If the temperature at the heating block is too high, the filament flows faster out of the nozzle and could therefore have a tendency to drip. If the heating block temperature is at the upper end of the recommendation by the filament producer, the temperature can be adjusted gradually to be approx. 5° C. lower. In the process, it must be considered that thin filaments (e.g. 0.8 mm) are heated faster than thick ones (e.g. 1.8 mm). The optimum temperature adjustments for thin filaments are accordingly lower than for thicker filaments.

Thread-forming frequently occurs when the print head must travel across surfaces where nothing is printed. It is therefore recommended that such travel distances be avoided. These adjustments can be made in the slicer. Another option is to increase the movement speed for the print head when it must jump from one point to the next one. By increasing this movement speed, the drip time for the filament is reduced. In some circumstances, increasing the movement speed by several mm/s may already be sufficient to avoid thread-forming or drip forming.

The print head of another preferred embodiment is characterized in that the fiber-reinforced composite material has a fiber volume share of approx. 20%-approx. 50%, preferably approx. 30%-approx. 40%, a rigidity ranging from approx. 50 GPa to approx. 200 GPa (gigapascal), a tensile strength between approx. 400 MPa and approx. 1500 MPa (megapascal) and a density between approx. 1 g/cm$^3$ and approx. 3 g/cm$^3$ (grams per cubic centimeter). The indicated parameter ranges can advantageously be achieved with the print head according to the invention for the component to be printed. The component is thus especially solid, robust, stable and compact. The listed parameter ranges have shown that the total component quality is increased, which also results in a longer service life for the printed components, desirable for a lasting use of the printed material.

The fiber volume content indicates the ratio of fibers to matrix. In particular, the fiber volume content indicates the volume of the fibers relative to the total volume of the fiber-reinforced materials. A fiber volume content of approx. 30% advantageously results in excellent adherence to the additional layers of the print material because there is sufficient bonding agent owing to the matrix. A fiber volume content of approx. 40% advantageously results in higher strengths, so that the printed component is particularly stable and robust. It is also possible to have a fiber volume content of approx. 60%. For other uses more than 60% fiber volume content can be reached. A lower fiber volume content, for example less than approx. 20%, is also possible, which is particularly advantageous for modulating parameters such as electrical conductivity, screening and/or sensor technology.

The rigidity describes a body's resistance to elastic deformations caused by a force or a moment (bending moment or torsion moment, depending on the stress). Different types of rigidity are therefore known from the prior art, such as elongation stiffness, shear stiffness, bending stiffness and torsion stiffness. The above-listed parameters for the rigidity preferably relate to one, several, or all types of rigidity, wherein it must be noted that the rigidity does not depend on the material itself, but also on the geometry. The tensile strength is one of several rigidity parameters for a material which describes the maximum mechanical tensile stress that the material can withstand.

According to a different preferred embodiment, the print head is characterized in that the cutting unit can be operated with a servo motor and/or a lever. For example, the cutting unit can be moved by the servo motor with the aid of the lever. A lever and/or a servo motor advantageously have proven to be especially reliable for cutting and/or shearing the material within the heating block. These can be operated manually and/or electronically.

A servo motor is an electric motor which allows controlling the angle position of its motor shaft, as well as the rotational speed and acceleration. A servo motor is preferably an electric motor with current, rotational frequency and/or position control. This allows adjusting specified currents, rotational speeds and/or rotational angles which can accordingly control the cutting unit movement. The lever can be an optional rigid body that can be rotated around a pivot and causes the activation of the cutting unit. The production costs are advantageously very low as a result of the print head design comprising a heating block with a cutting unit, a nozzle and a lever.

In another aspect, the invention relates to a cutting method, involving a print head according to the invention. The cutting preferably is realized with a cutting unit located inside the heating block. The cutting unit can be embodied as Haya radially movable disc or as rotating drum, wherein it may also be preferably to have a knife and/or a clamp-type element. The cutting unit can be moved in the direction of the filament so as to cut it at a desired location or in a desired region. The cutting unit can preferably be deactivated during the printing and can be activated once more with a new fiber-reinforced composite material. Especially complex components can advantageously be produced with the cutting unit, for example if these contain many indentations, patterns, perforations and/or scoring marks.

The average person skilled in the art realizes that technical features, definitions, advantages and/or preferred embodiments, which have been described for the inventive print head, also apply equally to the inventive method and vice versa.

The fact that the preferred method comprises a print head according to the invention means in particular that the method is realized using a preferred embodiment of the inventive print head. The invention therefore relates in a further aspect to a method for cutting a material during the additive manufacturing, once a print head according to one or several of the preferred embodiments is made available, characterized in that the cutting unit carries out a linear movement, a rotation, or that the print head itself carries out a linear movement or a rotation, so that the filament is cut and/or sheared.

Analogous, the preferred method can be described such that the method for cutting a material during the additive manufacturing comprises the following steps:

a) Providing a print head according to one or several of the preferred embodiments of the inventive print head.
b) Realizing a linear movement or rotation of the cutting unit or the print head itself, so that the filament is cut and/or sheared.

In particular according to prior art, it is decisive for the cut in front of the heating block that the cutting edge is not deformed. Otherwise, it would result in the remaining fiber filament getting jammed inside and plugging the nozzle channel. A deformation of the filament in front of the cutting device would mean that the filament can no longer be inserted into the nozzle channel. Both cases result in a printing stop and must be avoided.

According to prior art, a cut after the nozzle must occur as close as possible to the surface to avoid material from gathering. The remaining piece between cut and nozzle would furthermore have to be pulled back with a retract. The cutting unit must then be tilted away and material conveyed forward for the printing.

The fiber bundle for preferred embodiments of the invention is deformed during the cut in the hot condition. The deformation can be avoided in that the filament is pulled back and remains in the rounded state as a result of the feed channel (or the PTFE tube). The retract length extends up to the cold region, so that the material can subsequently be transported again through the nozzle. The hot region here means the region along the heating block while the cold region refers to regions located outside of the heating block.

Through the preferred melting of the matrix polymer, the supporting cross section that forms the resistance for the cutting process is strongly reduced and only brittle fibers need to be cut. For thicker fiber bundles, this technology is advantageous and promises success. With smaller fiber bundles in the filament, however, the cutting force is reduced considerably, so that lighter components can advantageously be used for realizing the cut.

This process (and thus also the arrangement of the cutting unit in the heating block) cannot be recognized by and would not occur to the average person skilled in the art. The reason for this, among other things, is that the process-technical sequence between conveying, cutting, retracting and conveying again, in combination with the use of fiber-reinforced continuous filaments, is not typical or is not prior art for 3D printers. The retract is used for the normal 3D printing to reduce the pressure in the nozzle and prevent after-dripping. Within the context of this invention, however, the retract is preferably used to restore the outer shape of the filament.

The cutting or shearing of the material is realized with the cutting unit via the effect of a mechanical force exerted onto the filament. As a result of the cutting unit movement, a force acts from the outside onto the material to be printed, respectively onto the filament. According to the 3$^{rd}$ Newton's Axiom (action=reaction) this results in stress expressed as tension which causes corresponding changes in the shape (deformation), depending on the rigidity. In particular, the material can be sheared or cut in the process.

Since the cutting unit is located in the heating block, it is particularly easy to carry out a cut because the filament liquefies inside the heating block. The positioning of the cutting unit with respect to the slicer adjustments has proven to be especially advantageous. The reason for this is that only a short distance must be considered in the slicer between the nozzle inlet inlet and the cutting unit since the cutting unit is located inside the heating block. An especially preferred variant has the cutting unit located precisely at the nozzle inlet, meaning S=0, so that no distance exists. S can also be selected small enough so that the remaining pulled out material does not extend over existing paths having a width of approx. 0.2 mm to approx. 1 mm. If the distance S is greater than 0, a small amount of material is still pulled from the nozzle following the cut. If S is in the preferred range of approx. 0.2 mm to approx. 1 mm, only a small amount is pulled out which advantageously is no longer important for the following printed path since there is no overlapping. It was surprising in that case that such a distance range leads to these advantageous effects. It was recognized that if approx. 20 to approx. 40 mm were to be pulled out, these pieces would have to be cut off at the end and/or these pieces would impede the printing process and could result in a collision and eventually therewith connected printing stop. These problems are advantageously avoided through the aforementioned distances of the parameter S. In addition, it could be determined that the printing speed of the print head has increased, owing to the fact that less force is needed for a cut as well as the positive effect on the slider.

According to a different preferred embodiment, the method is characterized in that the cutting unit performs a linear movement, the rotating drum a rotation or the print head itself carries out a linear movement or a rotation, so that the filament is cut and/or sheared. The advantages of the inventive print head mentioned in the above also apply to the method according to the invention.

In the case of the radially, movable disc as cutting unit, the cut or the shearing occurs preferably in transverse direction. The cutting unit advantageously allows inserting several reinforced regions into the layer. Two or more components can furthermore be printed without direct connection, or predetermined breaking points can be inserted, which is a great advantage.

To specify the meaning of the word "transverse" or "transverse direction" in this context, it is preferred if the filament movement is judged by a three-dimensional speed vector. The speed vector is also described by three vector components, positioned orthogonal to each other in three spatial directions. The direction of the components here can be optionally selected. Transverse in this case means preferably that the cutting unit movement in the case of an radially movable disc can be described through vector components perpendicular to the speed vector of the filament.

The cutting unit can preferably also be embodied as a rotating drum. The cut in that case is through a rotational movement of the drum. Owing to the rotational movement, one cutting edge closes off the nozzle inlet and thus causes the cutting/shearing of the material. The material can be fed via a tube as feed channel into the rotating drum. The rotating drum preferably realizes a rotational movement up to approx. 50°, preferably up to approx. 30° and especially preferred up to approx. 20°. The advantages of the rotational angles mentioned in the above are also realized for the method according to the invention. The rotational movement of the cutting unit, in particular as a rotating drum, can rotate around the two axis as well as the 3 axis with respect to the rotational axis. The rotating drum advantageously can be used variably for different rotational axes, so that different forms, structures, patterns and/or indentations can be inserted into the printing material and thus the component. With some applications, it can be desirable to have only a rotational movement around the 2-axis or only a rotational movement around the 3-axis, which is advantageously possible with the rotating drum.

The 2 and 3 axis here refer to the counterparts to the y and z axis. However, the x, y and z axes refer to a global (coordinate system for the total configuration) and the 1, 2 and 3 axes to a local system (coordinate system for individual components).

It can be preferable if several print head components, for example the feed channel, the cutting edge, the heating block and possibly existing cooling bodies, jointly carry out a rotational movement or a linear movement. The material can also be cut and/or sheared with a uniform movement of these components. The linear movement preferably is a translational movement along the 1 axis while the rotational movement preferably extends along the 2 axis as rotational axis. The rotational angles to be considered in this case are the above-mentioned angles of up to 50°, preferably up to 30°, especially preferred up to 20°. It must be mentioned in this case that for these embodiments, the cutting unit forms the cutting edges which are preferably located in front of the nozzle inlet and within a distance S thereto. The nozzle inlet is opened and closed owing to the linear movement or the rotational movement. A closing indicates a material cut while an opening of the whist inlet allows the material to be fed through the nozzle and onto the print bed.

In another aspect, the invention relates to a system comprising an inventive print head. For example, the system can be a 3D printer that comprises the print head according to the invention. The system can also comprise a multi-material print head, meaning the system comprising several print heads.

The average person skilled in the art recognizes that technical features, definitions, advantages and/or preferred embodiments, described for the print head according to the invention and the inventive method, apply in the same way to the inventive system (multi-material print head or 3D printer) and vice versa.

The system therefore refers to a multi-material print head or a 3D printer comprising at least one print head according to the invention. The invention therefore also relates to a multi-material print head system, comprising at least a first print head and a second print head, characterized in that the first print head and/or the second print head refers to a print head according to one of the preferred embodiments for the inventive print head. Analogous, a system preferably refers to a multi-material print head system comprising at least two individual print heads, characterized in that at least one of the two print heads is a print head according to one of the preferred embodiments of the print head according to the invention. The average person skilled in the art recognizes that within the context of the invention, the terms "system" and "multi-material print head" or "3D printer" can be use analogously. The height for the nozzles and/or the print heads of the system is preferably not adjustable or is adjustable, wherein preferably the height adjustment is carried out with a compensator.

With the aid of a multi-material print head, several components with a multitude of materials can advantageously be produced in one printing operation, thereby providing clearly more options for the 3D printing since totally different plastics can be combined in a single component. The different materials, especially the different plastics, can serve different purposes. The composite fiber material has high mechanical characteristics, in particular a higher stability for the component. As a result, the component becomes more stable, robust and has a higher service life through improved component quality.

For example, it may be preferable to use strands for the printing of the component, so as to offer electrical conductivity for specific uses. More complex structures can be printed in connection with thermoplastics that are not filled or are filled with short fibers/particles. The reason for this is that there are no marginal conditions, such a minimum deposit radii and wide path width, as is the case with the fiber-reinforced compound material. By integrating support materials, overhangs of more than 45° are possible during the printing process while the material can be removed following the printing.

A stranded wire refers preferably to an electrical conductor composed of thin individual wires which can thus be easily bent. Copper is primary used for the conductor. The individual wires of the stranded wire (up to several hundred) are mostly enveloped by a joint insulating sleeve. Such conductors are called stranded wire conductors. If several such conductors are combined in a cable, they are called cores.

According to a different preferred embodiment, the system is characterized in that it comprises 2 or more print heads and/or nozzles, wherein the height of the nozzles and/or the print heads is immovable or adjustable.

The individual print heads can be supplied via a mechanical system with different filaments, each composed of different materials. The mechanical system can comprise a conveying unit. The respective material is conveyed via a conveying drive and mating gear into the individual print heads or nozzles. A separation of conveying drive and print head can be effected through a Bowden tube, so that the conveying drive need not be moved with the print head and the moving mass is thus reduced. This is also advantageous for the printing speed. It is furthermore possible to transport several materials into a heated nozzle. In that case, the other material should be pulled back until both materials can be supplied jointly to avoid jams. The print heads can have separate coolers or can be combined in a joint cooling body. A rigid arrangement (all nozzles at the same height) or an active height adjustment is advantageous. The height adjustment can be realized with a compensator, for example, or also through activation with a respective movement unit, so that for each nozzle the height can be actively adjusted, wherein this advantageously permits each print head and/or nozzle to print material for producing a component while the other inactive nozzles are at a greater distance to the surface.

The system of another preferred embodiment is characterized in that the system comprises a computing unit that runs a software which determines a movement of the system or the print head. As previously described, the software is referred to as slicer and is jointly responsible for the printing of the material on the print bed. The running of a software by the computing unit can analogously be described in that a software is installed in the computing unit.

The slicer "allows a file to be printable," for example for a 3D printer. For this, models are exported into the STL data format and loaded into the slicer. In the STL file, the geometry of the component to be produced is preferably described as grid (mesh). The program then "cuts" these into individual, horizontal layers and specifies for each layer the print head movement path. This represents the instruction for the system or the 3D printer on how to print and is also called a G-code.

In addition to the x, y and z coordinates, the G code also provides information on the movement speed, the temperature of the heating block, the control of the cooling body, the material feeding speed, the generating of additional structures for the component, and the like.

Important parameters for producing the component can be adjusted, such as layer height, printing speed and heating block temperature.

The layer height corresponds to the thickness of the individual layers which is preferably somewhat less than the nozzle diameter, as a rule approx. by 50%. In general it holds true that the higher the individual layers, the worse the optics of the print. However, the printing time is shortened.

The effects of the printing speed on the component quality depend on the 3D printer. Depending on the model, the settings can range from approx. 60 to approx. 90 mm/s. Some slicers also permit adjusting various speeds for different regions of the print model. As example we can mention Cura, Simplify3d and Slic3r.

The printing temperature influences the processing of the material. Some slicer programs permit adjusting different temperatures for each layer. The temperature can in this way be adjusted explicitly for problematic layers.

For the processing with the slicer, it has thus proven especially advantageous that the cutting unit is located inside the heating block since only a short distance between the nozzle, respectively the nozzle inlet, and the cutting unit must be considered. As a result, the computing time within the slicer and thus advantageously the total printing time is shortened.

The inventive print head, the system and the method will be explained further in the following with the aid of examples, without being restricted to these example.

DETAILED DESCRIPTION

Figure 1:
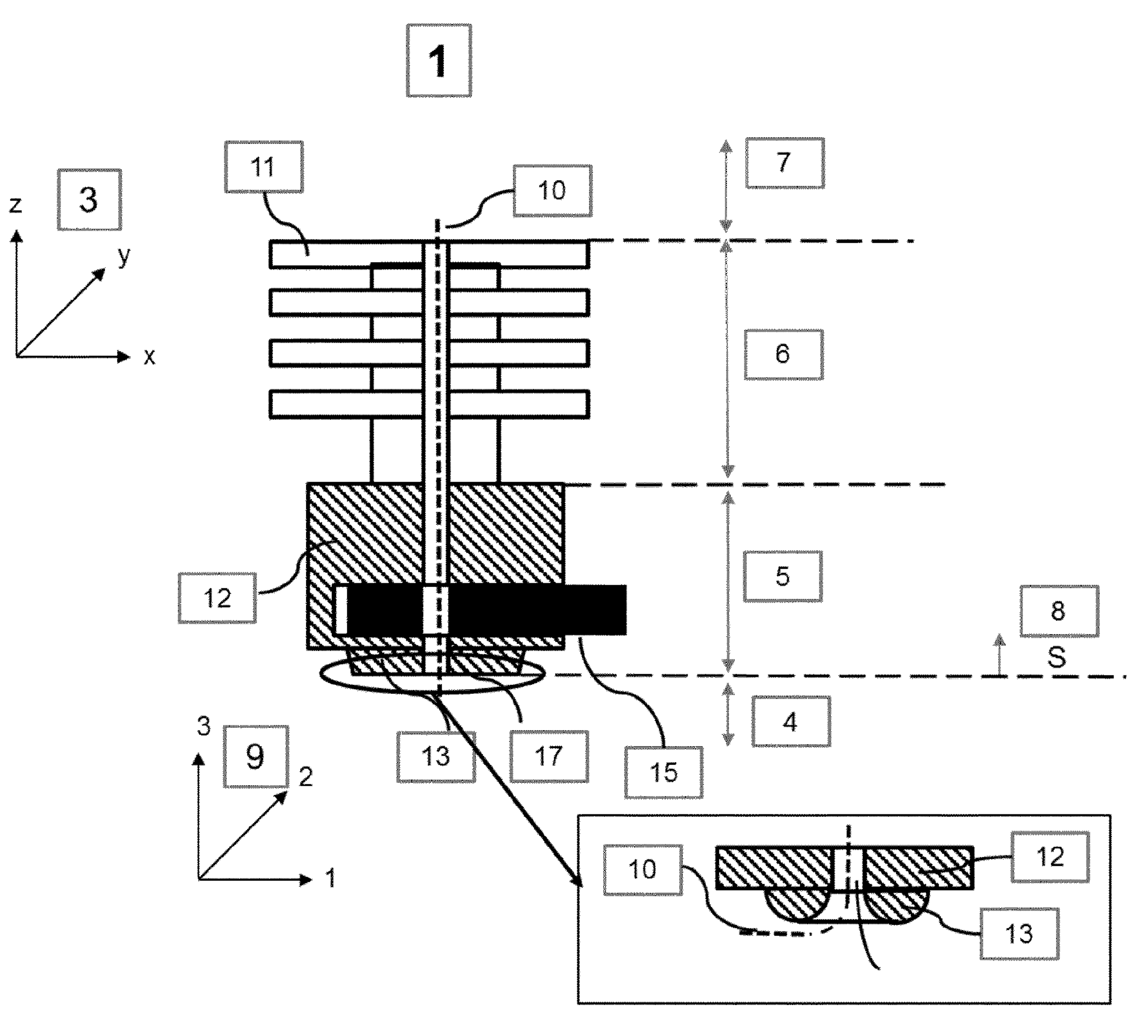
FIG. 1 Representation of a preferred print head and a close-up view of the nozzle.

FIG. 1 illustrates a preferred embodiment of the inventive print head, showing in particular specific regions of the print head, so that different positions can be clearly characterized. In addition, two coordinate systems 3 and 9 are imaged. The coordinate system 3, comprising the x, y and z axis, is a global coordinate system while a local coordinate system is shown with 9 for the print head.

Located within a heating block 12 is a cutting unit in a form of radially movable disc 15. A filament 10 comprising a fiber and a matrix as compound material travels through a feed channel via a cooling body 11 into the heating block 12. The material is cut and/or sheared with the radially movable disc 15. As a result of the cutting, it is advantageously possible to produce especially complex components which contain, for example, indentations, patterns and structures. The print head can be described through various spatial regions that correspond to the individual components of the print head. The filament 10 initially extends along a region in front of the cooling body 7 so that it can be conveyed with a not shown mechanical device into the print head. Subsequently, the filament 10 is moved further along a cold region 6, having the dimensions of the cooling body 11. Following this, the filament reaches the heating block 12 with an increased temperature, so that the filament 10 melts. The radially movable disc 15 can cut and/or shear the filament especially easily since it is located as cutting unit inside the heating block 12. A hot region 5 extends along the heating unit 12. The material then travels through a nozzle 13, so that the material 10 can reach a print bed (not shown) extending along a region 4 that adjoins the heating block 12. The cutting unit is located at a nozzle outlet and comprises a cutting edge 17. Thus, only a short distance S between the nozzle 13 and the cutting unit must be considered in the slicer, which accelerates the computing operation and accelerates the total printing process as a whole.

FIG. 1 furthermore shows a close-up view of the nozzle 13 region which is drawn in as a circle while the actual close-up view is shown in the box following the arrow. The course of the material is shown as a curvy, dashed line. The nozzle 13 can take the form of a nozzle bore 14 (see FIG. 9), as shown with example herein. The inside and the outside edge of the nozzle are rounded in the image, so that the filament can be guided easier and to prevent material damage through sharp edges. Additional components such as temperature sensors and heating bodies, which can be located in the heating block 12, are not shown herein. The positioning of the cutting unit within the heating block 12 and/or within the hot region 5 has proven to be especially advantageous for the cutting or shearing of the material 10 since it requires little force.

Figure 2:
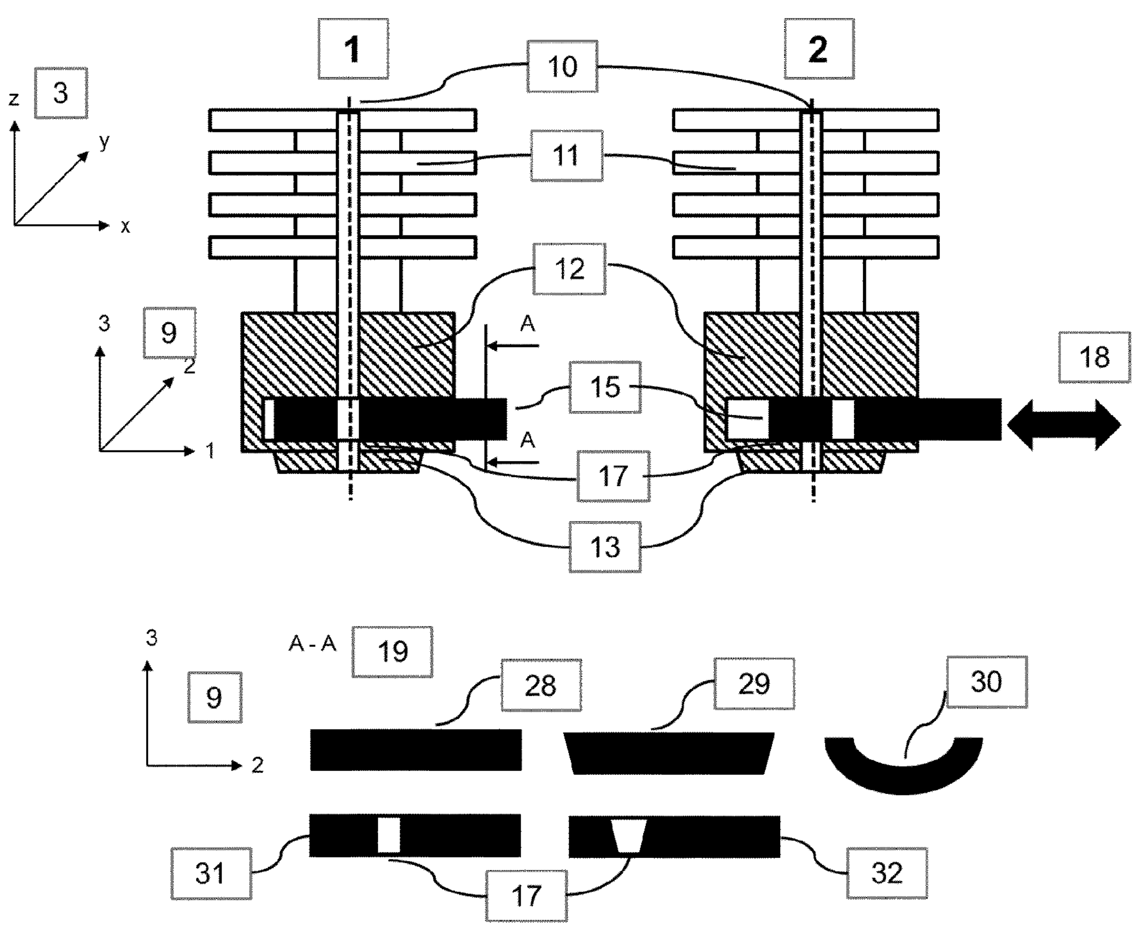
FIG. 2 Representation of a cut through as radially movable disc.

FIG. 2 shows two modes, 1 and 2, wherein 1 represents the "printing" mode and 2 the "cutting" mode. With the aid of a translational movement of the radially movable disc 15, which comprises a cutting edge, the material is cut and/or sheared. With the translational movement of the radially movable disc 15, the cutting edge 17 closes off the inlet of the nozzle 13. This cut is particularly easy because of the positioning of the cutting unit, here a radially movable disc 15. In addition, a cross section A-A of the radially movable disc 15 can be seen farther down in FIG. 2, which can be embodied by various geometric forms. These geometric forms have proven very advantageous with respect to the guidance of the cutting operation with the radially movable disc 15. The radially movable disc can, for example, have a rectangular cross section 28, a trapezoidal-shaped cross section 29, or a semi-circular cross section (round arc) 30. The radially movable disc 15 can furthermore comprise a cutting bore with rectangular 31 or conical 32 shape. The conical cutting bore 32 has proven very advantageous since the material 10 is only cut and/or sheared along the cutting edge 17 and not also at the entrance to the radially movable disc 15. This is prevented by the conical cutting bore 31 since the upper edge of the cutting disc does not come in contact with the material 10.

Figure 3:
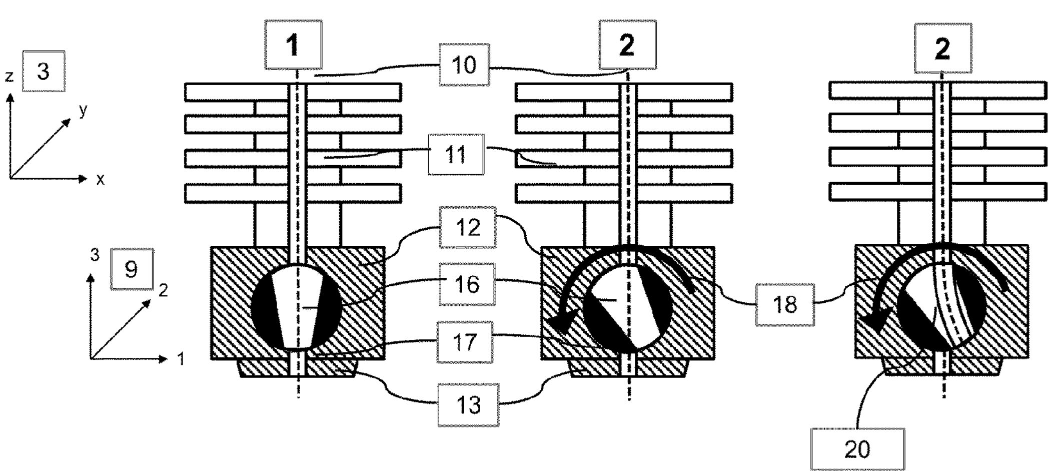
FIG. 3 Representation of a cut through a rotating drum.

FIG. 3 shows the print head design for which the cutting unit is a rotating drum 16. Owing to the rotational movement along the 2 axis, the material is cut and/or sheared by the cutting edge 17 of the rotating drum. The extreme right shows an embodiment where the feed channel is a tube which leads the material 10 directly to the rotating drum 16. As imaged in FIG. 3, the indentation in the rotating drum that forms the cutting edge 17 is not "straight." The bore for the indentation in the rotating drum 16 is preferably conical. The inventors recognized that this has great advantages since, as a result, the upper edge or even the guide tube itself are cut and/or sheared. If the nozzle 13 is embodied as bore inside the heating block 12, the diameter for the nozzle 13 and that of the bore in the rotating drum 16 are preferably basically identical, for example 1 mm. A tube or hose 20 forming the feed channel can comprise PTFE. The rotating drum preferably carries out rotations up to 50°, wherein rotations up to 30° or only up to 20° are also preferred. The rotational angles have to be large enough so that they can completely close off the nozzle 13 inlet. The material is cut and/or sheared only through completely closing the nozzle 13 inlet. Since the rotating drum 16 is installed in the heating block 12, it is preferably embodied with smaller or identical dimensions. The filament liquefies and is therefore liquid or paste-like since the heating block 12 has a temperature that is identical to or above the melting temperature of the material or a material component, The cut or the shearing by the rotating drum 16 is particularly easy because less force is required due to the liquefying of the material.

Figure 4:
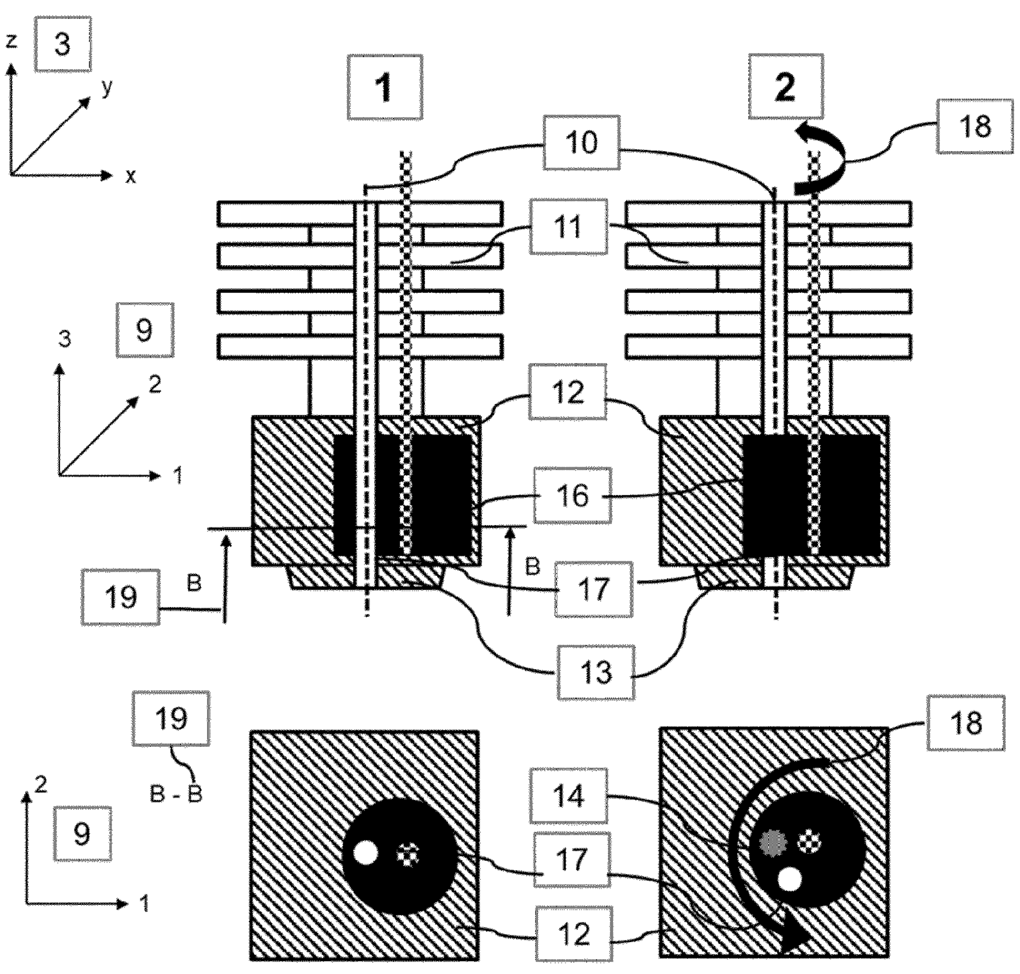
FIG. 4 Representation of a cut through a rotation around the 3 axis.

FIG. 4 also shows an option for making a cut using a rotational movement of the cutting unit embodied as rotating drum 16, wherein the rotational axis here is the 3 axis. The B-B cross section 19 is shown further below. The principle of a cut through rotational movement is analogous to FIG. 2. The cutting edge 17 respectively closes off the movement is nozzle inlet and the nozzle bore 14 of the nozzle 13, if a cut is to be made; otherwise, the bore of the cutting unit is located above the nozzle inlet.

Figure 5:
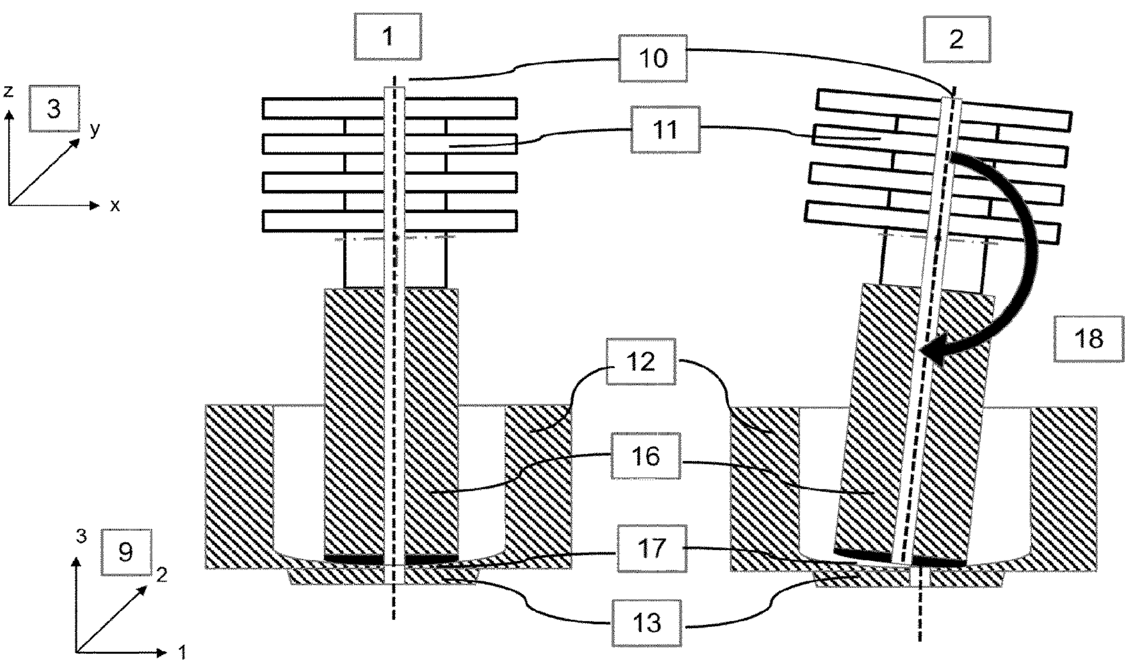
FIG. 5 Representation of a cut through a rotation around the 2 axis.

FIG. 5 shows a further option for cutting and/or shearing the material 10, wherein the cutting edges 17 are still located at the nozzle 13 inlet and thus within the heating unit 12. This variant is also preferred since additional components such as an radially movable disc 15 or a rotating drum 16 are not needed. For this, the hot region 5 extends somewhat above the heating block 12. For this, a feed-in comprising the hot region 5, the cold region 6 and the feed channel carries out a rotational movement, along with the 2-direction as rotational axis.

Figure 6:
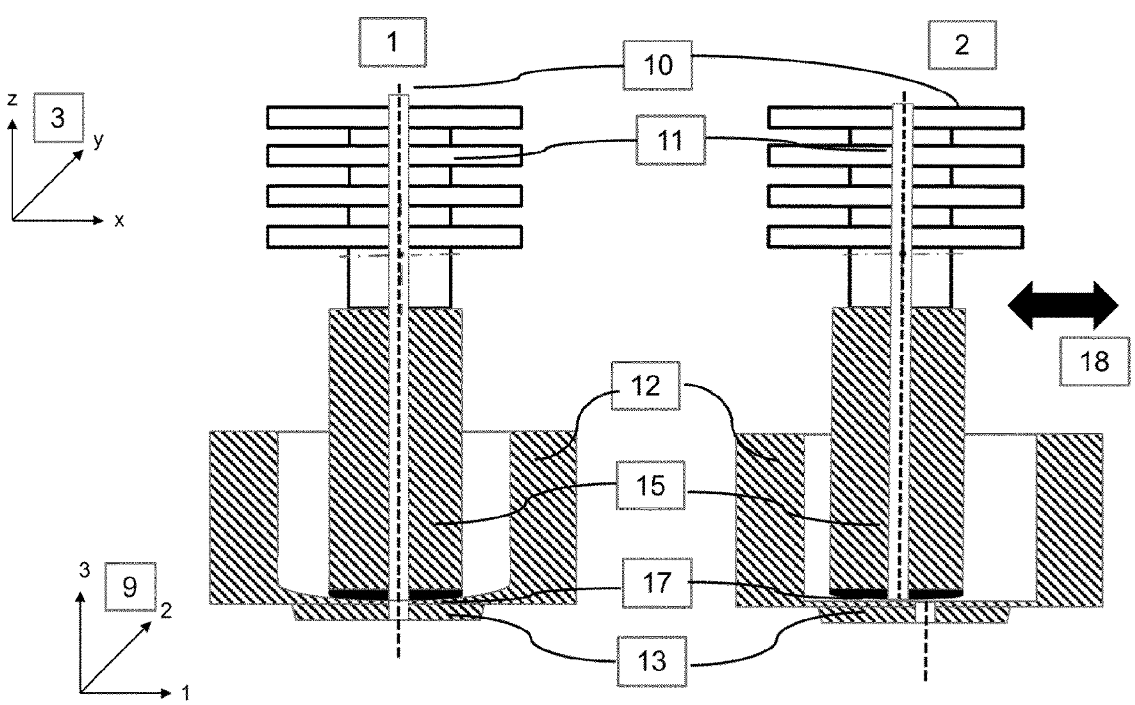
FIG. 6 Representation of a cut through displacement along the 1 axis.

FIG. 6 shows the same cutting operating as FIG. 5, wherein no rotational movement is realized here, but a translational movement of the feed-in, comprising the hot region 5, the cold region 6 and the feed channel. The hot region 5 itself can be heated, for example with heating elements, or can be in direct contact with the heating block 12. The material 10 can thus be melted in the hot region already.

Figure 7:
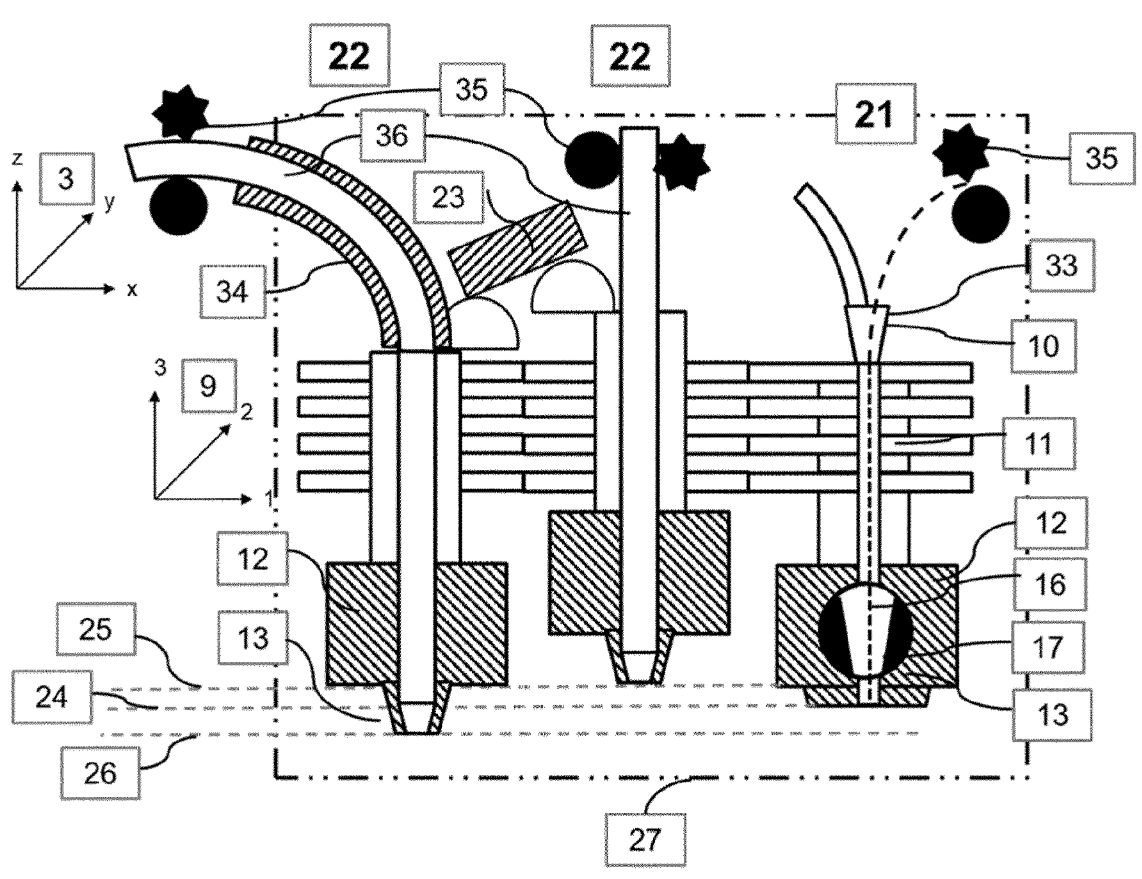
FIG. 7 Representation of a system comprising several print heads.

FIG. 7 shows an embodiment of a system represented by a multi-material print head 27. Complex components requiring more material than a fiber and a matrix can thus be advantageously produced. The component can thus have a higher strength, so that more robust components with a longer service life are obtained. The filaments have a larger diameter 22 (left and center). The respective material is conveyed with a conveying drive 35 by a mating gear into the print heads. The conveying drive 35 can be connected directly with the system or, as shown, the material can also be transported via a Bowden tube 34 into the print heads. A separation thus exists between the conveying drive 35 and the system, so that advantageously less mass must be moved. A filament with short fiber/particle reinforcement or comprising thermoplastics 36 can also be supplied to one of the print heads (here left and center) to obtain especially robust components. As a result, the printing speed is increased and the printing time shortened. It is furthermore possible to transport several materials into the print head and thus the nozzle, wherein specific materials can also be retracted by the conveying drive 35. With the aid of a compensator 23, the height of the individual print heads (left and center) can be adjusted. For this, a print head can be located immovably in a fixed plane (right) and can be configured as a nozzle system 21, as shown with a level, fixed nozzle 24. A parking position for movable nozzles 25 and an active position for movable nozzles 26 are shown with dashed lines. The system advantageously allows each print head to print when activated to the print bed for producing the component. Inactive nozzles meanwhile achieve a longer distance to the print bed.

Figure 8:
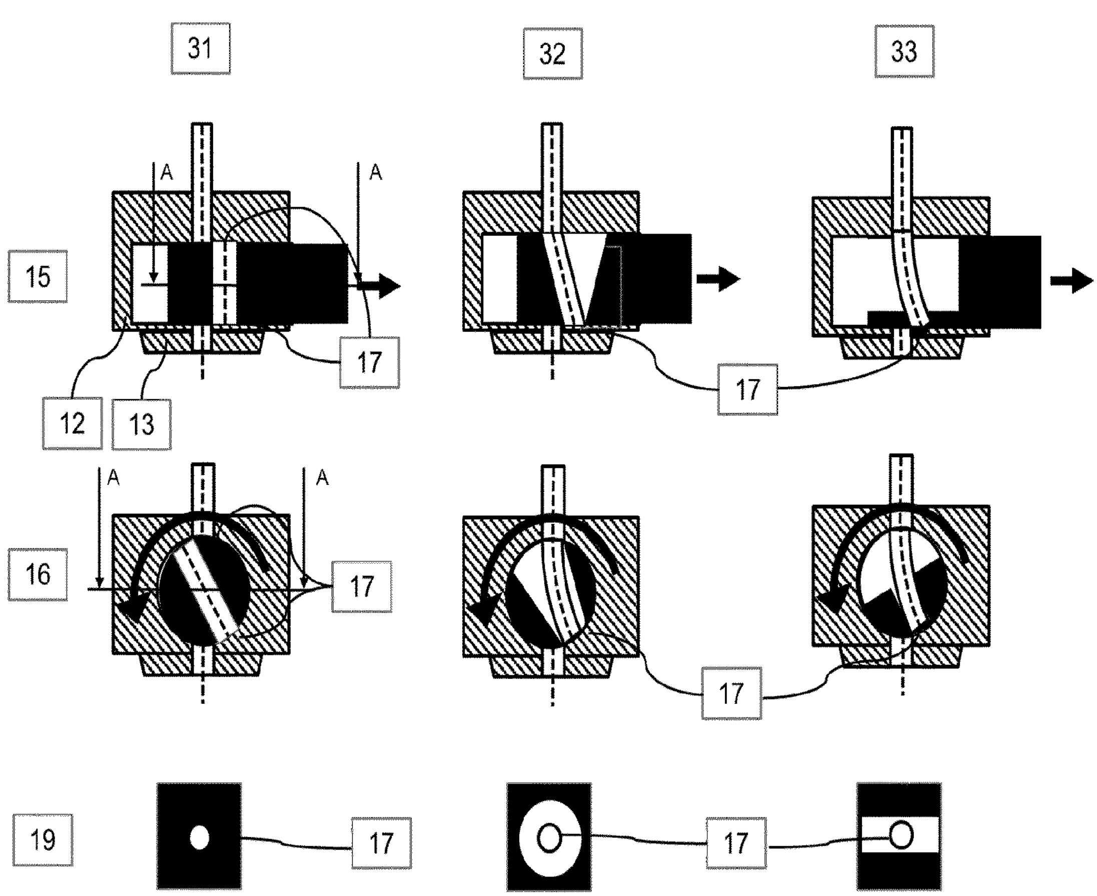
FIG. 8 Representation of a configuration of the cutting unit.

FIG. 8 shows the possible configuration of the cutting unit. The image was drawn as a matrix wherein the straight cutting disc 15, the rotating drum 16 and the cross-sectional cuts 19, marked A-A, are arranged in lines. Arranged in columns are first the straight bore 31, the conical bore 32 and a groove with bore 33. As example for all images, the heating block 12 and the nozzle 13 were inserted on the upper left side. Other elements are analogous to the other images. A tube is drawn in at 32 and 33 for guiding the filament. At 31, a cutting edge 17 forms at the top and the bottom of the cutting unit. At 32 and 33, the bore is embodied such that the cut can occur only at the bottom of the cutting edge 17. The edge above is offset such that during the cutting, this edge does not cut or squeeze this filament edge, respectively the tube. This is possible when the upper diameter of the cone 32 is large enough so that during the rotational movement the edge does not come in contact with the tube, while the cutting edge is formed on the bottom, near the nozzle. With the groove containing the bore 33 the material is removed through a groove, so that here too the upper edge does not touch the tube while the lower cutting edge is formed near the nozzle.

Figure 9:
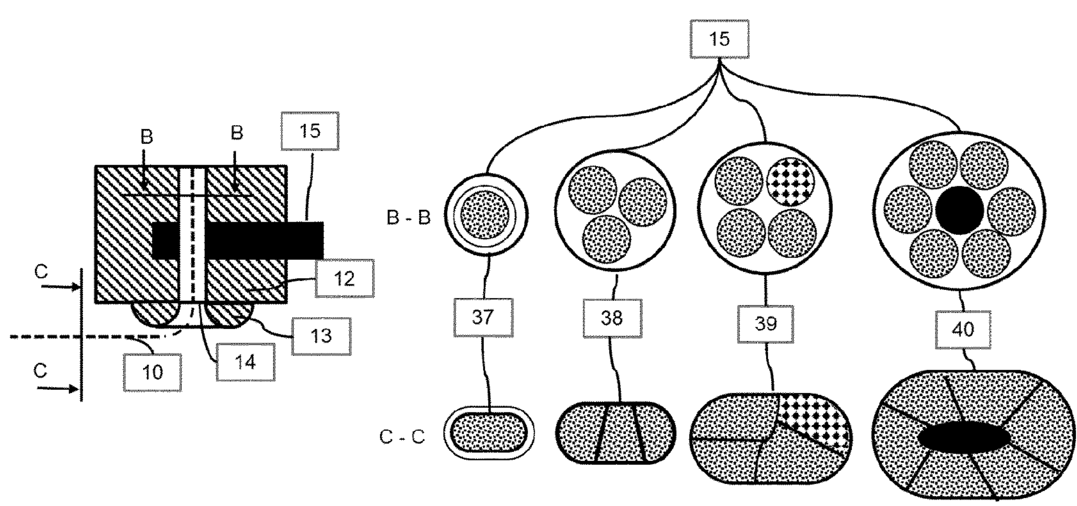
FIG. 9 Representation of cross-sectional changes for one or several of the filaments used.

FIG. 9 shows the cross-sectional changes if one or several filaments are used. The cross section B-B shows the arrangement of the filaments in the feed-in 15, and the cross section C-C shows the deposited path. The cross sections B-B are described in the following. An endless fiber-reinforced filament, additionally enveloped by a thermoplastic material, is supplied at 37. As a result, the layer adherence can advantageously be increased. At 38, 3 fiber-reinforced continuous filaments are joined. At 39, 4 materials are joined with 3 strands of the type A, e.g. carbon fibers, and one strand of the type B, e.g. aramid fibers. At 40, 6 strands are joined, 5 fiber-reinforced continuous filaments and one strand C in the center which can be a different fiber-reinforced continuous material, such as the type B or also a different non fiber-reinforced plastic to increase the matrix share or to be used as thread-type sensor. The cross sections C-C will now be described. At 37, an ellipsoidal cross section is generated from a round cross section in that the rounded nozzle 13 melts the material in the heating block 12 and presses onto the platform. The strand is enveloped at 37 with a thermoplastic material for better adherence. At 38, the 3 fiber-reinforced continuous filaments are arranged in C-C side-by-side. At 39, the 4 filaments are optionally arranged, wherein the material of type B is located in the cross sectional view beside type A. At 40, the type C material is enveloped by the fiber-reinforced continuous material (5 filaments). Different embodiments of the printed cross section result, depending on the number of supplied strands, the size of the guide 15 (PTFE tube) and the combination of printing direction and feed orientation, wherein mixed forms of the cross sections as shown are also possible side-by-side at 38, centrally at 39, or enveloped at 40.

REFERENCE NUMBER LIST

1 printing mode
2 cutting mode
3 global coordinate system
4 region following the nozzle
5 hot region
6 cold region
7 region in front of the cooling body
8 distance S between the nozzle or nozzle outlet-inlet and the cutting edge
9 local coordinate system
10 filament/material
11 cooling body
12 heating block
13 nozzle
14 nozzle bore
15 radially movable disc
16 rotating drum
17 cutting edge
18 cutting movement
19 cutting unit cross section
20 tube or pipe as feed channel
21 nozzle system with cutting unit for compound materials
22 diameter
23 compensator
24 fixed nozzle, positioned flat
25 parking position for movable nozzles
26 active position for movable nozzles
27 multi-material print head
28 cross section linear cutting disc—rectangle
29 cross section linear cutting disc—trapeze
30 cross section linear cutting disc—round arc
31 straight bore
32 conical bore
33 bore with groove
34 Bowden tube
35 conveying drive
36 filament with short fiber/particle reinforcement or comprising thermoplastics
37 feeding a filament with thermoplastic envelope
38 feeding of 3 fiber-reinforced continuous filaments
39 feeding of 4 fiber-reinforced continuous filaments, 3 of type A and 1 of type B
40 feeding of 6 fiber-reinforced continuous filaments and 1 of type C

The invention claimed is:

1. A print head for additive manufacturing of fiber-reinforced composite materials, comprising: a feed channel extending through the print head; a heating block; a nozzle comprising an inlet and an outlet and attached to the heating block or integrated into the heating block; and a cutting unit integrated into the heating block wherein a filament of the fiber-reinforced material enters the cutting unit from the feed channel and the cutting unit is configured to cut and/or shear the filament prior to the filament entering the inlet of the nozzle via the feed channel for being delivered through the outlet of the nozzle for deposition on a print bed, wherein the heating block is a fixed and single component to heat the filament.

2. The print head according to claim 1, wherein the cutting unit is located within a distance S to the nozzle outlet, wherein S ranges from 0 to about 100 mm.

3. The print head according to claim 1, wherein the cutting unit comprises at least one axially movable cutting disc or rotating drum.

4. The print head according to claim 3, wherein the rotating drum carries out a rotating movement so that the filament is cut or sheared through the rotating movement, wherein the rotating movement is at an angle of up to 50°.

5. The print head according to claim 1, wherein the cutting unit comprises an axially movable disc that has a rectangular, trapezoid, conical or semi-circular cross section, wherein the nozzle outlet is closable through a movement of the cutting unit.

6. The print head according to claim 1, wherein the cutting unit comprises a cutting bore embodied as at least one of a straight bore, a conical bore or a groove.

7. The print head according to claim 1, wherein a temperature within the heating block ranges up to 400° C. so that the filament is melted inside the heating block.

8. The print head according to claim 1, wherein the print head comprises a cooling body which spatially surrounds the filament prior to a transition of the filament into the heating block.

9. The print head according to claim 1, wherein the print head comprises a retract which moves the filament back into the print head.

10. The print head according to claim 1, wherein the fiber-reinforced compound material has a fiber content of 20%-50%, a rigidity ranging from 50 GPa to 200 GPa, a tensile strength between 400 MPa and 1500 MPa and a density between 1 g/cm$^3$ and 3 g/cm$^3$.

11. The print head according to claim 1, wherein the cutting unit is operable with a servo motor and/or a lever.

12. A method for cutting a material during additive manufacturing using a print head according to claim 1, comprising steps of: causing the cutting unit or the printhead itself to execute a linear or rotational movement so that the filament is cut and/or sheared.

13. A system comprising a print head according claim 1, and further comprises a computing unit, wherein a slicer is installed in the computing unit.

14. The system according to claim 13, comprising at least two print heads and/or nozzles, wherein a height for the nozzles and/or the print heads is immovable or adjustable.

15. The system according to claim 13 wherein the slicer determines a movement of the system or one or several of the print heads.

* * * * *